(12) United States Patent
Sousa et al.

(10) Patent No.: US 11,550,686 B2
(45) Date of Patent: Jan. 10, 2023

(54) ADAPTABLE ONLINE BREAKPOINT DETECTION OVER I/O TRACE TIME SERIES VIA DEEP NEURAL NETWORK AUTOENCODERS RE-PARAMETERIZATION

(71) Applicant: EMC IP Holding Company LLC, Hopkinton, MA (US)

(72) Inventors: Eduardo Vera Sousa, Niterói (BR); Vinicius Michel Gottin, Rio de Janeiro (BR); Percy Rivera Salas, Montreal (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 882 days.

(21) Appl. No.: 16/402,110

(22) Filed: May 2, 2019

(65) Prior Publication Data

US 2020/0349427 A1 Nov. 5, 2020

(51) Int. Cl.
| | |
|---|---|
| *G06F 11/30* | (2006.01) |
| *G06N 3/08* | (2006.01) |
| *G06F 11/34* | (2006.01) |

(52) U.S. Cl.
CPC ...... *G06F 11/3041* (2013.01); *G06F 11/3485* (2013.01); *G06N 3/08* (2013.01)

(58) Field of Classification Search
CPC ............. G06F 11/3041; G06F 11/3485; G06F 11/3055; G06F 11/3409; G06F 11/3447; G06N 3/08; G06N 3/084; G06N 3/0454
See application file for complete search history.

(56) References Cited

U.S. PATENT DOCUMENTS

| | | | |
|---|---|---|---|
| 2018/0231969 A1* | 8/2018 | Noda | G05B 23/02 |
| 2019/0317817 A1* | 10/2019 | Brown | G06F 9/5077 |
| 2019/0392252 A1* | 12/2019 | Fighel | G06K 9/6222 |
| 2020/0210393 A1* | 7/2020 | Beaver | G06F 17/18 |

OTHER PUBLICATIONS

Authors: Wei-Han Lee, Bongjun Ko, Jorge Ortize and Ruby Lee; Title: Time Series Segmentation through Automatic Feature Learning; Date: Jan. 26, 2018 Publisher: 2018 ACM Reference Format, DOI:10.475/123_4; Website: https://arxiv.org/pdf/1801.05394.pdf.*

W.-H. Lee, J. Ortiz, B. Ko and R. Lee, "Time Series Segmentation through Automatic Feature Learning," 2018.

S. Aminikhanghahi and D. J. Cook, "A survey of methods for time series change point detection," Knowledge and Information Systems, vol. 51, No. 2, pp. 339-367, 2017.

E. Keogh and S. Kasetty, "On the Need for Time Series Data Mining Benchmarks: A Survey and Empirical Demonstration," Data Mining and Knowledge Discovery, vol. 7, No. 4, pp. 349-371,2003.

(Continued)

*Primary Examiner* — Thien Nguyen
(74) *Attorney, Agent, or Firm* — Workman Nydegger

(57) ABSTRACT

One example method includes accessing I/O traces, generating parameters based on the I/O traces, and defining an autoencoder deep neural network, training the autoencoder deep neural network using the parameters, collecting and storing new I/O traces, computing an encoded features difference series using the new I/O traces, detecting breakpoints in the encoded features difference series, evaluating a utility of the breakpoints, and performing an action based on the breakpoint utility evaluation.

20 Claims, 32 Drawing Sheets

(56) References Cited

OTHER PUBLICATIONS

R. P. Adams and D. J. C. MacKay, "Bayesian Online Changepoint Detection," arXiv, vol. 0710.3742, 2007.

P. Du, W. A. Kibbe and S. M. Lin, "Improved peak detection in mass spectrum by incorporating continuous wavelet transform-based pattern matching," Bioinformatics, vol. 22, No. 17, pp. 2059-2065, 2006.

M. Abadi, P. Barham, J. Chen, Z. Chen, A. Davis, J. Dean, M. Devin, S. Ghemawat, G. Irving, M. Isard, M. Kudlur, J. Levenberg, R. Monga, S. Moore, D. G. Murray, B. Steiner, P. Tucker, V. Vasudevan, P. Warden, M. Wicke, Y. Yu and X. Zheng, "TensorFlow: A System for Large-Scale Machine Learning," in 12th USENIX Symposium on Operating Systems Design and Implementation (OSDI16), 2016.

U.S. Appl. No. 16/263,135, titled "Adaptive Look-Ahead Configuration for Prefectching Data in Input/Output Dperations," filed Jan. 31, 2019.

U.S. Appl. No. 16/397,596, titled "Adaptive Look-Ahead Configuration for Prefetching Data in Input/Output Dperations Based on Request Size and Frequency," filed Apr. 29, 2019.

E. Jones, T. Oliphant, P. Peterson and others, "SciPy: Open source scientific tools for Python," 2001.

G. Cybenko, "Continuous Valued Neural Networks with Two Hidden Layers are Sufficient," U. of Illinois at Urbana-Champaing Center for Supercomputing Research and Development.

F. Chollet and others, "Keras," 2015.

\* cited by examiner

ADAPTABLE ONLINE BREAKPOINT DETECTION OVER I/O TRACE TIME SERIES VIA DEEP NEURAL NETWORK AUTOENCODERS RE-PARAMETERIZATION

FIELD OF THE INVENTION

Embodiments of the present invention generally relate to multi-channel time series of I/O traces processed into time series of cache hits and pollution. More particularly, at least some embodiments of the invention relate to systems, hardware, software, computer-readable media, and methods for the adaptable online breakpoint detection in I/O trace time series that can be used to characterize the operational states of the underlying system.

BACKGROUND

Computational apparatus such as storage arrays, hyperconverged infrastructure and other appliances store sizeable amounts of information as operational logs. These data typically comprise multi-channel time series collected by an internal logging system, either raw, as in the case of I/O traces, or processed.

One core aspect of raw and processed I/O trace time series is that they are guided by the workloads being executed in the computational environment. Thus, they present changes over time that cause traditional stationary models to drift and become unusable. While several approaches for breakpoint detection exist, there are no works focused on the domain of I/O traces, particularly regarding the re-parametrization to deal with the problem of model drift.

The discovery of breakpoints in multichannel time series in I/O traces is a sub-problem of the general breakpoint discovery problem. The specific problem is the self-adaptation of the model over long-term periods as new samples are collected. Following is a brief discussion of some challenges faced by typical applications in this field.

One such problem concerns data volume and multi-channel I/O traces. Production storage systems containing logs of I/O requests may comprise large amounts of data. In one illustrative example, 15 minutes of operation of a single fileid (identification of a storage system) comprise 3.2M I/O ops (read, write, control, and others) with associated information (size, the logical block address access by the request in the given logical unit). Furthermore, these data are naturally high-dimensional. In the same example, that single fileid comprises 135 series, one for each logical unit.

Yet another problem with known approaches concerns the lack of annotated data for supervised training. For example, while it may be possible to orchestrate the system administration for collection of relevant events that indicate breakpoints, there is typically a lack of historical annotated databases. Thus, a technique that can bootstrap a definition of breakpoints in an unsupervised way would be useful. Discarding historical behavior in deployed systems hinders the applicability of breakpoint detection for practical purposes such as look-ahead configuration, cache policy adaptation and anomaly detection.

Still another problem concerns model/system drift and incompleteness of training data. Particularly, as new data is collected, the operational states in the underlying representation of the domain can change. Furthermore, certain important states may be underrepresented in historical data. This is particularly relevant when the historical data comprises a short period, relative to the long-term operation of the appliance. A method is required for adapting the series characterization model when new operational modes are encountered. As well, such a model should be periodically corrected to account for changes in the domain and for new observed states.

A final example of problems with known approaches concerns online detection of breakpoints in I/O traces. For example, the detection of breakpoints must be as close to real-time as possible. In the most adopted definition in the scientific literature, this is measured by the number of additional samples required to determine whether a particular sample data is a breakpoint. This requirement arises from the intended applications of breakpoint detection in I/O traces domain, namely, cache policy tuning and anomaly detection, both of which require a fast response time.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings. Color versions of FIGS. 1-30 are included in Appendix A hereto, which is hereby incorporated into this disclosure in its entirety by this reference.

DETAILED DESCRIPTION OF SOME EXAMPLE EMBODIMENTS

Figure 1:
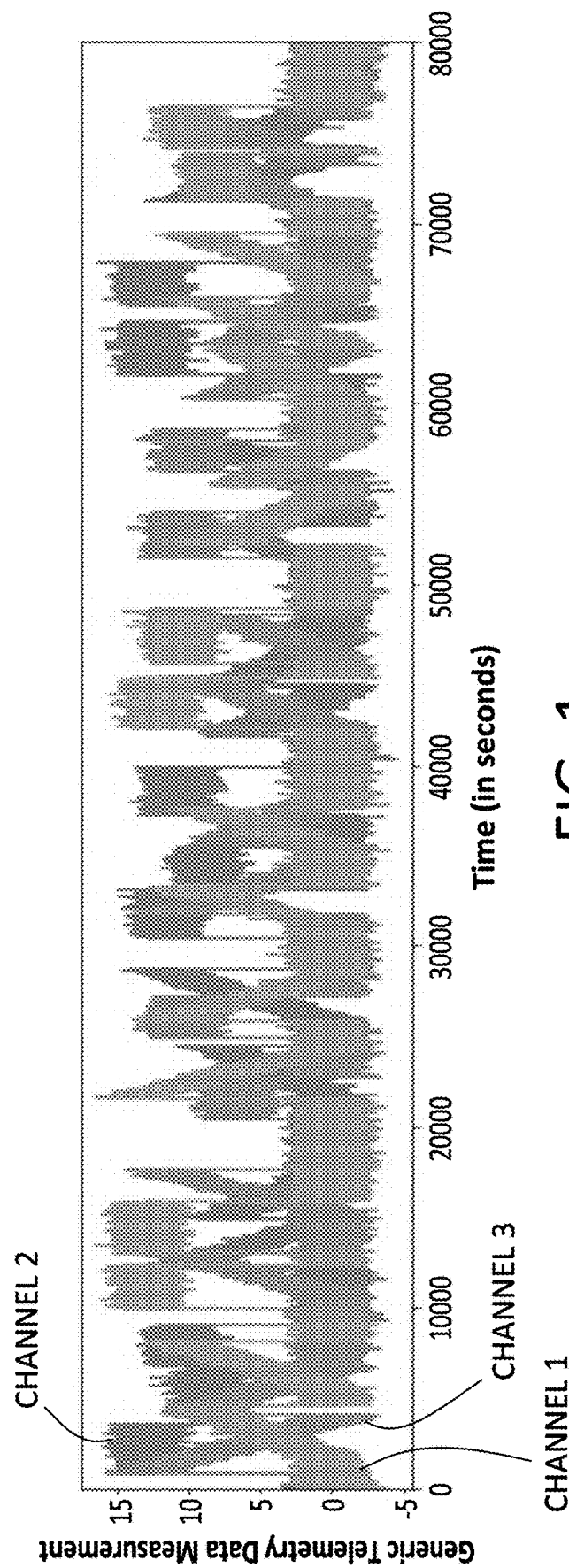
FIG. 1 discloses a multi-channel time series.

Embodiments of the present invention generally relate to multi-channel time series of I/O traces processed into time series of cache hits and pollution. More particularly, at least some embodiments of the invention relate to systems, hardware, software, computer-readable media, and methods for the adaptable online breakpoint detection in I/O trace time series that can be used to characterize the operational states of the underlying system.

By way of brief introduction, computational apparatus such as storage arrays, hyper-converged infrastructure and other appliances store sizeable amounts of information as operational logs. These data typically comprise multi-channel time series collected by an internal logging system. Example embodiments of the invention are concerned particularly with multi-channel time series in the domain of cache policy optimization. Detecting breakpoints, which define similar segments in these multi-channel time series of I/O traces, allow performance of automatic tuning of the storage appliance to optimally satisfy application requirements, such as data prefetching configuration and cache policy adaptation. Other applications that can make use of the characterization of breakpoint in such series relate to automated anomaly detection. As well, an autoencoder-based architecture for time series characterization is disclosed. Example embodiments leverage the samples collected during the breakpoint detection step as ground truth, allowing the detection to improve over time. Further, embodiments of the invention instantiate and exemplify the disclosed concepts and approaches in the context of a storage system such as, for example, the Dell-EMC PowerMax system, although the scope of the invention is not limited to this example storage system.

In more detail, at least some embodiments of the invention are directed to a method and architecture for adaptable online breakpoint detection in I/O trace time series that can be used to characterize the operational states of the underlying system. Example embodiments leverage a deep neural network autoencoder and a utility function evaluation step to continuously re-parameterize the model for detecting relevant breakpoints and enabling the online characterization of I/O trace time series over a long period of time. The validity of an example implementation of the approach is demonstrated with a use case in the cache policy optimization domain, and thus use a processed series of I/O traces—directly converted into a cache hit and cache pollution series.

Among other things then, and as set forth in this disclosure, example embodiments of the invention continuously query monitoring or logging systems in the computational appliance/environment for new incoming data. Both these data as well as all relevant intermediate data and models are stored in repositories, such as databases and data lakes for example, to enable several aspects of the general approach. The feedback loop employed in embodiments of the invention enables the re-parameterization of the autoencoder model that enables the disclosed breakpoint detection approach.

Particularly, embodiments of the invention leverage the historical breakpoint data collected along with the previous computed utility scores for evaluating whether a new autoencoder DNN needs to be trained to account for model drift. The disclosed processes include leveraging the historical data, if available, plus the collected I/O traces for training the autoencoder DNN, but also for deciding on an appropriate parameterization. This training takes place once, when enough samples are collected, and then once more every time the breakpoint utility evaluation consistently drops.

Advantageously then, some embodiments of the invention may provide various benefits and improvements relative to the configuration and operation of conventional hardware, software, systems and methods. To illustrate, one or more embodiments of the invention may provide processes for breakpoint detection that implement, in the domain of I/O traces, re-parametrization to deal with the problem of model drift. An embodiment of the invention provides for self-adaptation of the model over long-term periods as new samples are collected from a multichannel time series in I/O traces. One or more embodiments of the invention include methods for adapting the series characterization model when new operational modes are encountered. Further, embodiments of the invention are able to periodically correct such a model to account for changes in the domain and for new observed states. Embodiments of the invention may also discover meaningful operational states from time series data, and then use that information to implement various improvements and automations. Embodiments of the invention also define a policy for optimal caching by identifying the operational state of the system, dictated by the applications running in the environment, which are reflected in the I/O trace time series. As a final example, embodiments of the invention can characterize unexpected breakpoints, that lead to undesired operational states, as anomalies, and thereby trigger operational actions to repair the system.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Background Regarding the Segmentation Problem

Following is a description of the general segmentation problem in the context of deep neural network (DNN) encoders. In the discussion, reference is made to FIGS. 1-10. In connection with the Figures of the present application, including FIGS. 1-10, it is noted that for FIGS. 1-3, 5, 8, 17-20, and 23-30, the x-axis refers to time (in seconds) and the y-axis refers to the measurement of some generic telemetry data, examples of which include, but are not limited to, memory footprint, CPU allocation, and the like. For FIGS. 21 and 22, the x-axis refers to the index of the window over the timeseries and y-axis to the distance between the features within those windows.

With reference first to FIG. 1, a multi-channel time series is represented as a generic time series in that Figure. Given that multi-channel time series, three channels in this example, and a training set in the same format, one goal is to detect those points where there is a change in the behavior of the time series, that is, to detect the breakpoints.

Figure 2:
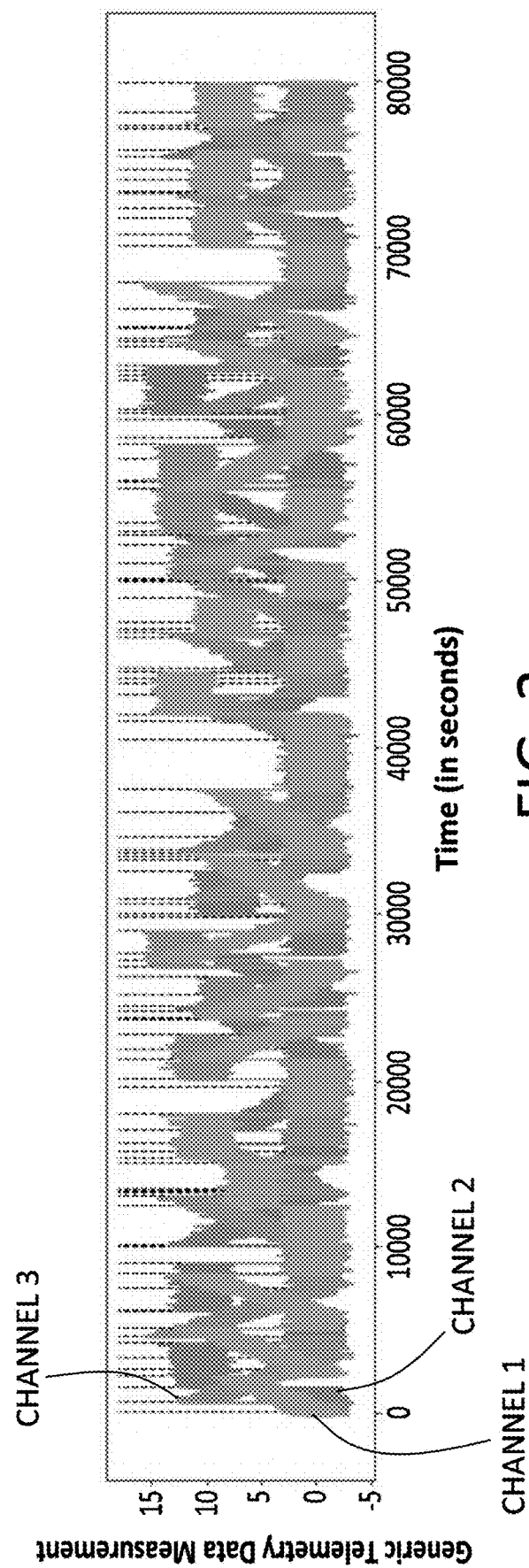
FIG. 2 discloses segments defined for a multi-channel time series.

In view of the example of FIG. 1, in FIG. 2 is represented the relevant beginning and end of each pattern in each of the three channels of data. The dashed lines correspond therefore to the ground truth for the method. These ground truth points can typically be determined a posteriori with domain knowledge. In general, embodiments of the invention leverage these ground truth points as soon as they are available for evaluating the detected breakpoints and potentially triggering a re-parameterization of the autoencoder network.

Figure 3:
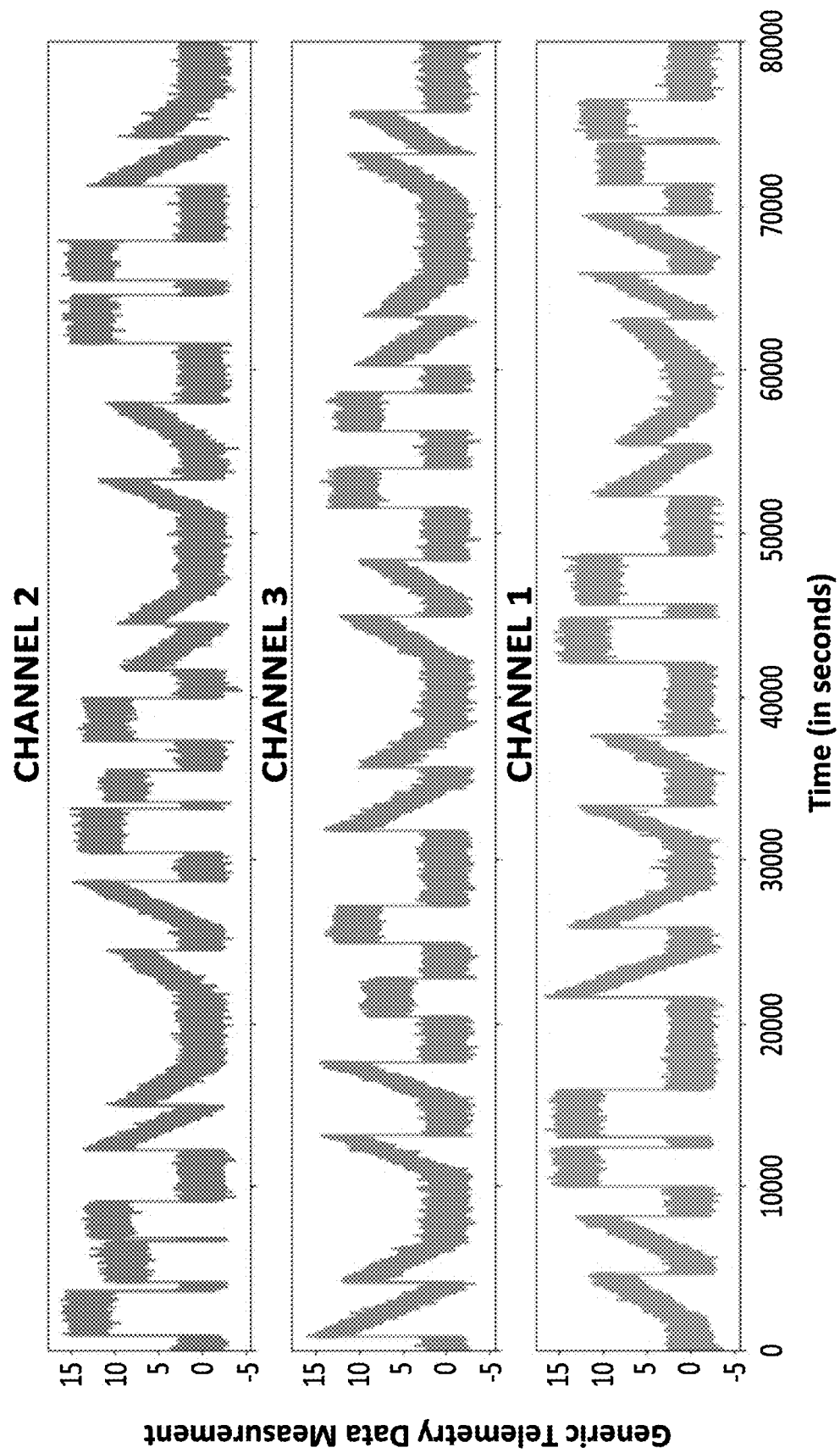
FIG. 3 discloses a series with separated channels.

With reference now to FIG. 3, the series of FIGS. 1 and 2 is shown, but with the three channels separated from each other. In order to detect the breakpoints, non-linear features are extracted from windows of the time series and, by computing the distance between them, the breakpoints can be detected. Example embodiments focus on the segmentation of the I/O traces, a particular kind of multi-channel time series. However, for simplicity of presentation, examples such as the ones in FIGS. 1-3 are shown over a simplified dataset. As shown in those Figures, the example dataset configures a multi-channel series with 'cylinder,' 'bell,' and 'funnel,' shaped patterns.

Figure 4:
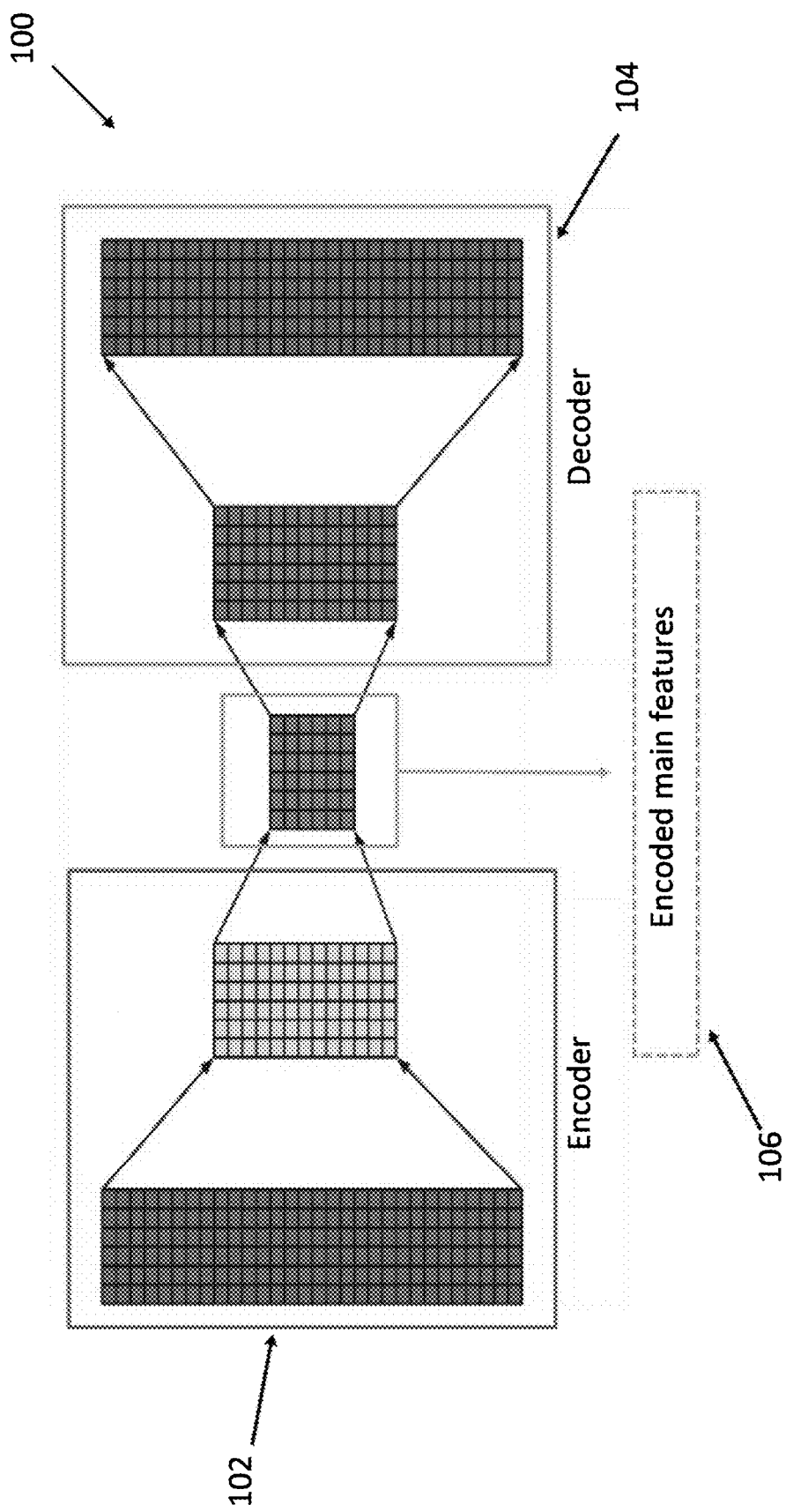
FIG. 4 discloses an example autoencoder neural network topology.

Turning now to FIG. 4, some details are provided concerning an autoencoder, one example of which is denoted at 100. In general, an autoencoder refers to a neural network which learns how to rebuild the data used as input to the autoencoder. Example embodiments of an autoencoder comprise two parts, namely, an encoder 102 and a decoder 104. The encoder 102 operates to reduce the data dimensionality, while the decoder 104 learns how to rebuild the data that has been processed by the encoder 102.

As also shown in FIG. 4, the dimensions of the encoded main features 106 layer are a fraction of the dimensions of the original data in the input, and output, layer. This configuration and operation helps to ensure that only the main dimensions, that is, the encoded main features 106, necessary to rebuild the data with the decoder 104 are kept in the middle layer of the network. A resource such as the encoded main features 106 is useful in machine learning since that resource can help to eliminate the need for manual feature engineering.

In at least some embodiments, the autoencoder 100 can be modeled as:

$$X = \varphi_{dec}(\varphi_{enc}(X)) + \in,$$

where $\varphi_{enc}$ is the function modeled by the encoder portion, $\varphi_{dec}$ is the function modeled by the decoder function and $\in$ is an error term. Since the error term $\in$ is unknown, the reconstructed series can be considered as:

$$\overline{X} = \varphi_{dec}(\varphi_{enc}(X))$$

Figure 5:
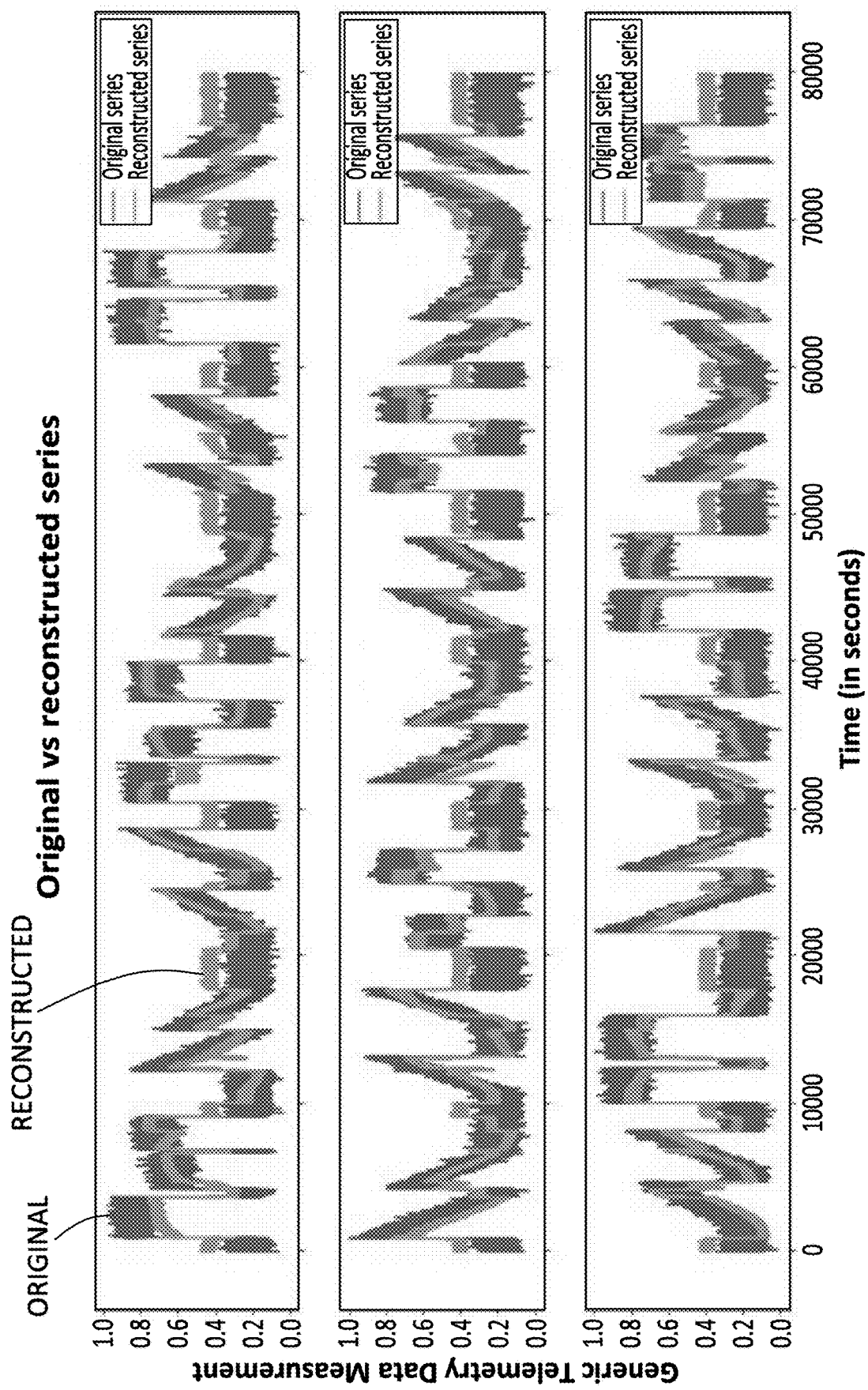
FIG. 5 shows reconstructed data over the separated channels shown in FIG. 3.

With reference now to FIG. 5, an example is shown of the reconstructed series $\overline{X}$ in the present example. Particularly, the reconstructed data is shown over each of the separated channels of the original data. In the context of breakpoint detection, this neural network is an autoencoder responsible for the extraction of encoded-main features from the traces.

Continuing reference to FIG. 5, details are provided concerning an example of an encoded main features difference series. In this example, a difference series is computed of the encoded features of consecutive windows. Each window is fed as input to the to the encoder model, resulting in the encoded main features of that window. These encoded main features comprise a nonlinear combination of the data that are most fitting for reconstructing the series, as noted elsewhere herein.

Formally, an evaluation is performed of each window from the set W in the network, that is, each window wi is used as input for the encoder portion of the neural network. The output is the set of main features F={fi}mi=0, for fi=φenc(wi). Then, by taking the Euclidean distance between sequential window main encoded features, that is, di=dist(fi, fi+1), a new series can be composed in a distance space based on the set D={di}Mi=−01. Following is a brief explanation of these concepts.

Figure 6:
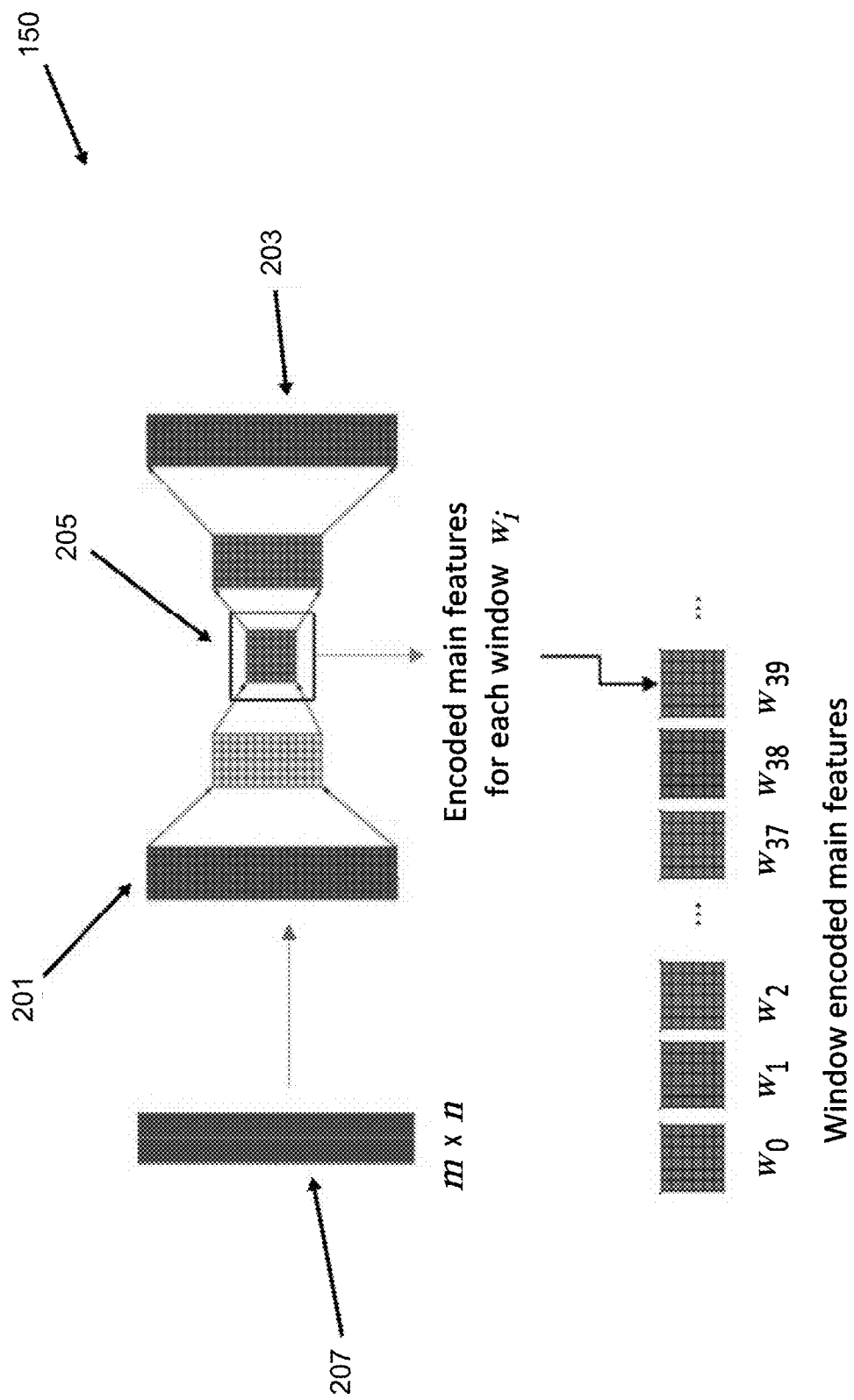
FIG. 6 discloses an arrangement for using an encoder model of an autoencoder DNN to generate window encoded main features.
Figure 7:
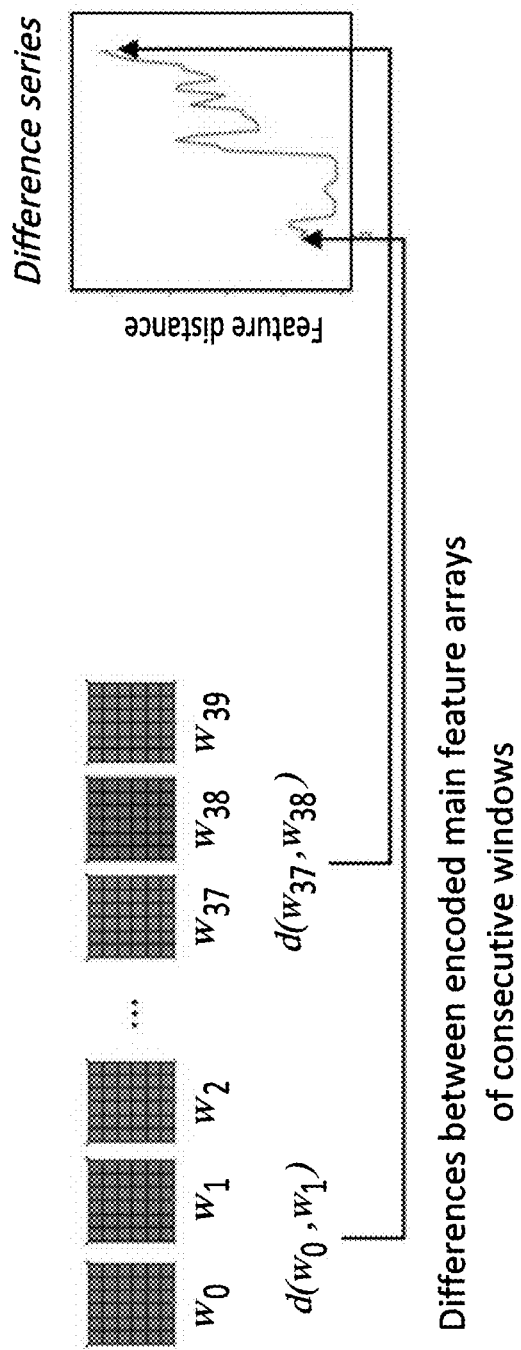
FIG. 7 discloses composing a difference series from the encoded main feature arrays of consecutive windows.

The encoded main features for each window composed from the I/O trace sample stream can be stored, although the general method does not require the historical window encoded main features. Furthermore, since the I/O trace samples themselves are stored, re-computing these as needed is trivial should the need arise. FIG. 6 shows a schematic example of this computation. Particularly, FIG. 6 discloses use of an encoder model 150 of the autoencoder deep neural network (DNN) to generate the window encoded main features. To this end, an encoder 201 and decoder 203 are indicated, as well as the encoded main features 205 for each wi. The input to the encoder 201 is an m×n data set 207.

As shown, the difference between the last obtained window encoded main features array and the previous one is calculated, and the resulting value stored in a difference series. In the particular example of FIG. 6, this means that the difference between w39 and w38 is computed as soon as the data required for composing the former is obtained. Various distance metrics can be used for this difference computation, one example of which is the Euclidean distance metric. Furthermore, for an online application of the method, it is desirable that this computation be fast and inexpensive, and the computation of the Euclidean distance between two arrays satisfies both requirements.

It is noted that the difference series is itself a time series. With attention now to FIG. 7, composition of the difference series from the encoded main feature arrays of consecutive windows is disclosed. As well, FIG. 7 indicates how each point in the difference series is generated from a pair of window encoded main feature arrays. The difference series is stored and used as input in the next step. The difference series generated in the example of FIGS. 1-10 is shown in FIG. 8, discussed below.

Figure 8:
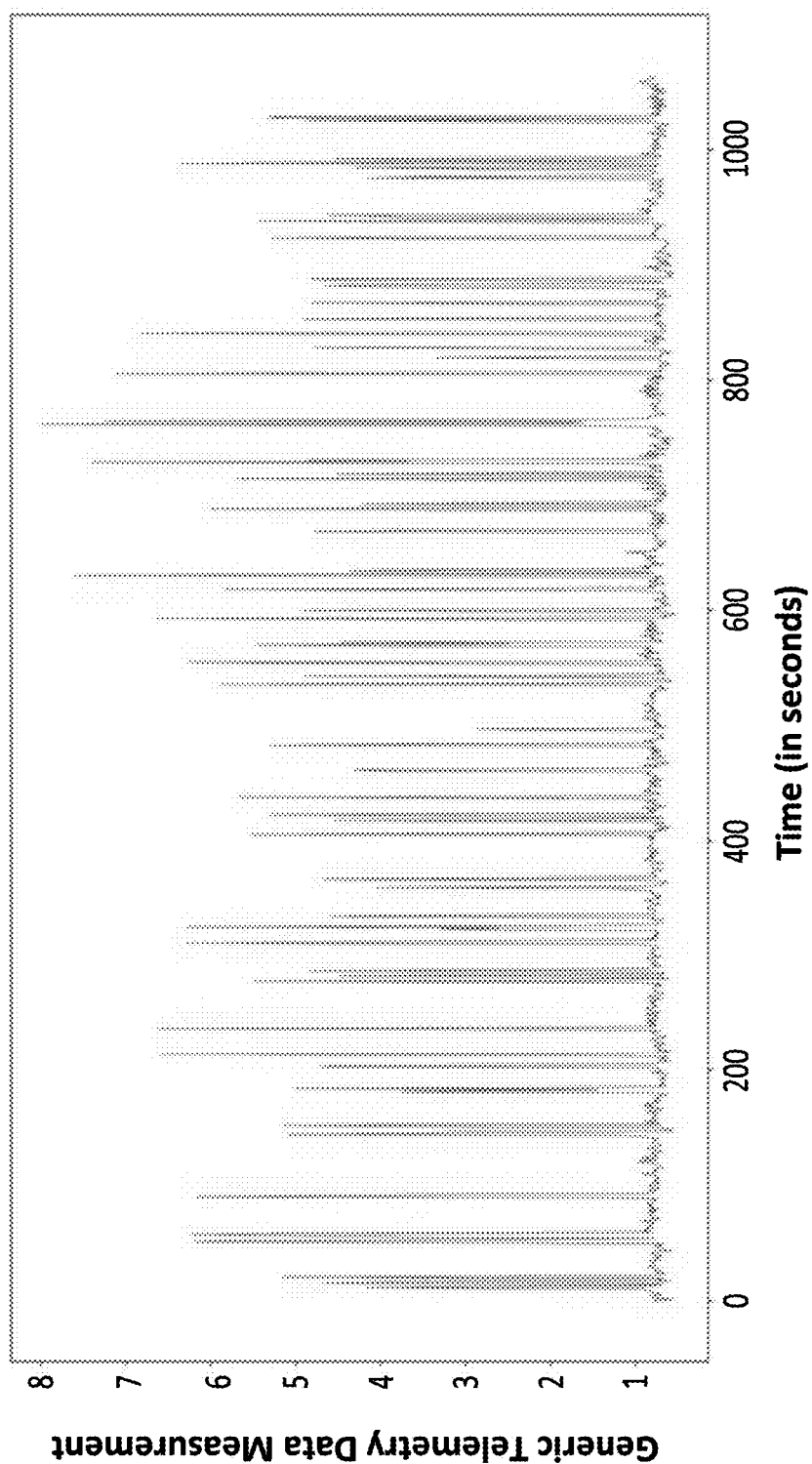
FIG. 8 discloses a difference series.

Particularly, in FIG. 8, the scale of the differences is given in a distance unit of the main encoded features. Since the patterns in the synthetic Cylinder-Bell-Funnel data used so far in the present example are well-behaved, this distance series disclosed in FIG. 8 presents well-defined peaks. The more convoluted the original data, the less prominent these peaks are in the difference series. Thus, it becomes more and more important to have a well parameterized autoencoder DNN and to have an appropriate utility evaluation function at hand in these more complex cases. One example of a more complex case is addressed elsewhere herein.

Figure 9:
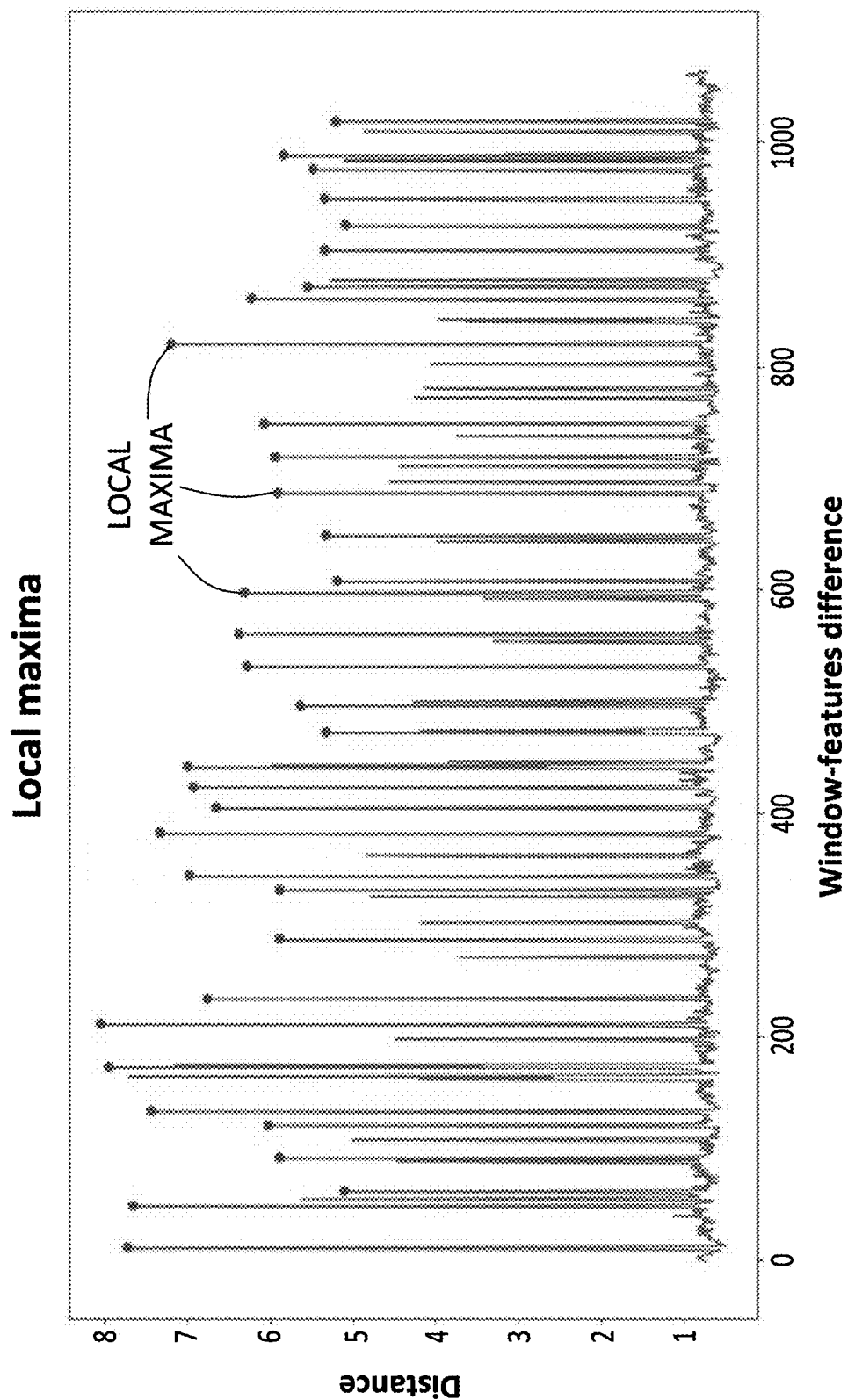
FIG. 9 discloses local maxima points detected in the difference series.
Figure 10:
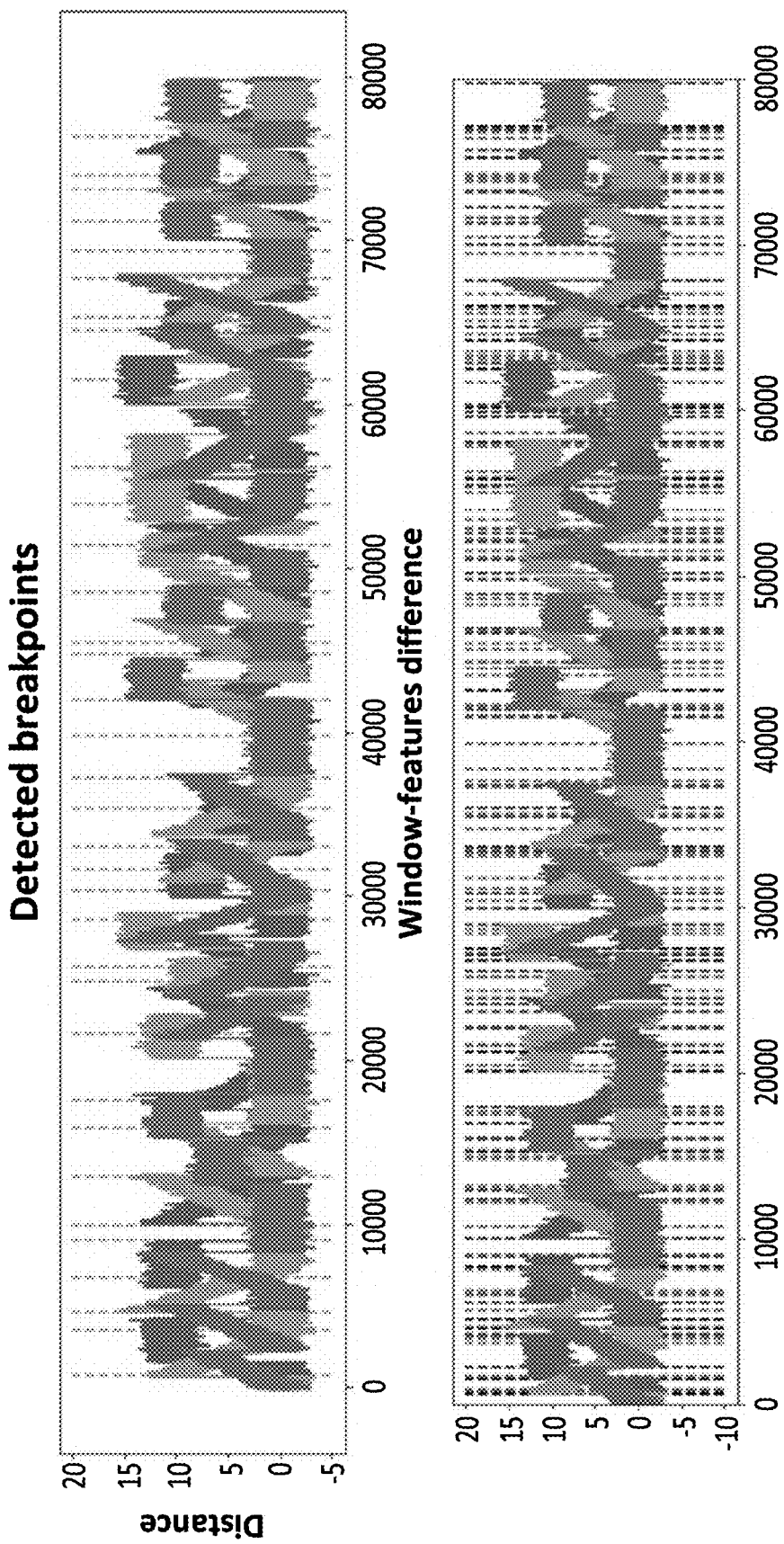
FIG. 10 discloses detected breakpoints over the multi-channel series via the autoencoder segmentation technique.

With FIG. 8 in view, and turning now to FIGS. 9 and 10 as well, details are provided concerning an approach for local maxima detection. This example approach considers that high discrepancies between consecutive window encoded main feature arrays correspond to breakpoints. This is reinforced by the fact that the windows overlap and, hence, any difference in the encoded main features of those windows is highlighted.

Each local maximum, when mapped back to the original time series, corresponds to a break point. The appropriate function for local maxima detection depends on the domain. FIG. 9 and FIG. 10 disclose an example of points categorized as maxima and how they relate to the original series as breakpoints. Note that in this example, the variations in the difference series are high, so the algorithm discards certain high differences due to their proximity to other peaks. In particular, FIG. 9 discloses the local maxima points detected in the difference series. FIG. 10 uses the same units on the horizontal and vertical axes as FIG. 9, and illustrates the detected breakpoints (see dashed vertical lines) over the original multi-channel series via the autoencoder segmentation technique.

B. Aspects of an Example Architecture and Environment

As noted herein, embodiments of the invention may instantiate and exemplify the disclosed concepts and approaches in the context of operating environments which may include a storage system such as, for example, the Dell-EMC PowerMax system and associated PowerMax appliances, software, and equipment, although the scope of the invention is not limited to this example storage system. In general, example architectures and operating environments can include a multi-controller, active/active scale-out architecture and industry standard, end-to-end Non-Volatile Memory express (NVMe). As well, such embodiments can implement inline, global deduplication, and compression, for improved datacenter efficiency. As well, architectures and environments such as PowerMax enable consolidation of block, file, mainframe, and IBM i workloads and modern, real-time analytics apps on a single array.

Figure 11:
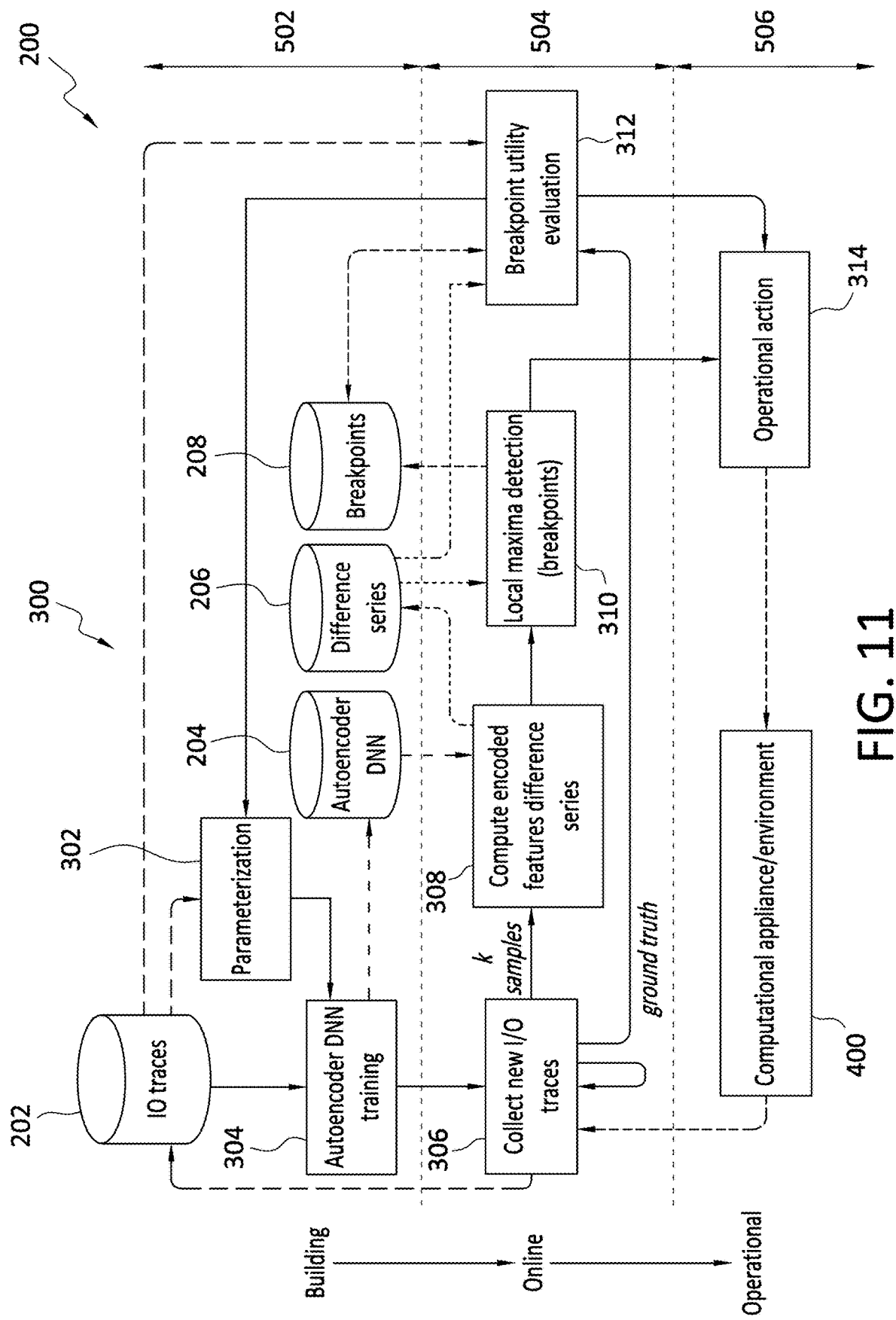
FIG. 11 discloses a process and architecture according to various embodiments of the invention.

With particular reference now to FIG. 11, details are provided concerning a system architecture and operating environment, one example of which is denoted generally at 200. With reference to the nomenclature and conventions of FIG. 11, it is noted that FIG. 11 discloses, among other things, a proposed approach for breakpoint detection via autoencoder in I/O trace time series. In that Figure, the boxes 302 . . . 314 represent elements of an example process 300, discussed in further detail below. Briefly however, the example process 300 may include the elements of parameterization 302, autoencoder DNN training 304, collecting new I/O traces 306, computing an encoded features difference series 308, local maxima detection 310, breakpoint utility evaluation 312, and operational action 314.

As further indicated in FIG. 11, data-producing and data-dependency relations are indicated by the dashed arrow-ended lines. Embodiments of the invention can be performed in connection with a computational appliance and/or environment 400, which can reside at a datacenter for example, and can perform, and/or cause the performance of, part or all of the process 300. As well, various data, information, and data structures, can be provided, utilized, and/or generated, in connection with various embodiments of the invention. Examples of such data and other elements include, but are not limited to, I/O traces data 202, autoencoder DNN 204, difference series 206, and breakpoints 208. In some example embodiments, the I/O traces data 202 comprises PowerMax I/O traces data, although that is not required, and I/O traces data associated with other environments can alternatively be utilized in connection with other embodiments of the invention.

FIG. 11 discloses, among other things, that example embodiments of the invention can involve various stages such as, for example, a building stage 502, an online stage 504, and an operational stage 506. Following is a brief introductory discussion of each of these stages, which is then followed by a more in-depth discussion of each stage.

In the building stage 502, an autoencoder DNN (Autoencoder DNN training) 304 is built over I/O traces time series. This building corresponds to the process disclosed earlier herein in the discussion of autoencoder DNN training 304, and FIGS. 4 and 5. The autoencoder DNN training 304 is parameterized according to the domain-dependent parametrization process 302. In a first moment, the I/O traces are obtained from historical data records, such as I/O traces data 202. The building stage 502 is re-triggered periodically depending on the utility evaluation performed in the online stage 504.

In the online stage 504, new I/O traces are continuously collected 306 from the computational environment 400. The I/O traces data 202 are also periodically fed to data to the most-recent autoencoder DNN 304 and collected 306. The encoded feature difference series are computed 308 and local maxima detection performed 310 as disclosed elsewhere herein in the discussion of FIGS. 6-10. The discovered breakpoints identified at 310 are then provided as an input to the operational stage 506, particularly, those discovered breakpoints 310 are used to inform one or more operational actions 314. Whenever the ground truth becomes known, a utility evaluation 312 of the generated breakpoints can be performed. Depending, for example, on a predefined maximum error or minimum quality threshold, this triggers a new round of the building stage 502.

With continued reference to FIG. 11, the operational stage 506 involves deciding on zero or more operational action(s) 314 to be performed in the computational appliance/environment 400 based on the breakpoints detected in the online stage 504. As noted earlier, each of the stages, that is, the building stage 502, online stage 504, operational stage 506, and respective associated processes and components, will now be addressed in more detail.

C. Aspects of an Example Building Stage

In general, the building stage 502 takes place once as a preprocessing process if historical annotated I/O traces are available, and then again once every time a relevant change is detected. The building stage 502 consumes I/O traces data 202, which can be either historical data, in the preprocessing execution or processed over operational time, and trains an autoencoder DNN that is available for the next stages.

With respect to the I/O traces, a database of I/O traces data 202 or an accessible repository such as a data lake or a shared directory with comma-separated-values files can be provided. The disclosed approach is based on leveraging annotated I/O traces data 202 for initial parameter estimation. This is described subsequently. The I/O traces data 202 also comprise a training set for the generation of an autoencoder deep neural network. It is important to note that the I/O traces data 202 must be in the same domain and granularity as the target data, which ensures the good quality of the autoencoder. With that, the system intrinsically learns the I/O traces behavior for the set of applications running. This task is represented in FIG. 11 by the dashed line pointing from the collect new I/O traces process 306 to the I/O traces data 202 repository. The optionally collected I/O traces are fed as input to the parameterization process 302 of the building stage 502. This is indicated by the dashed line from I/O traces collection to the parameterization step in FIG. 11.

With continued reference to FIG. 11, details are provided concerning the example parameterization process 302. As indicated, the parameterization process 302 receives as input the collected I/O traces data 202 and outputs a set of parameters to the autoencoder DNN training process 304. The parameterization process 302 involves leveraging an approach that comprises parameter estimation based on the analysis of the ROC Curve, considering that the ground truth is known.

In more detail, it has been experimentally shown that the encoded features layer size fs is given by fs=0.1×is, where is corresponds to the input layer size. For the window/overlapping size, the analysis is based in cumulative distribution functions (CDF) of true-positive segment sizes and shows that the best results are achieved when CDF=0.1.

The window size and window overlapping size parameters are both domain-dependent. One experimental validation shows that the ideal size of the window relates to average pattern-length in the series. An example application of the disclosed method is discussed below in the Example at part E hereof. The window-overlapping size relates to the core of the method, which is based on encoded main features differences. The overlapping is required to capture gradual variation in the series, diminishing the effect of noise and outliers in the original data. This also relates to the self-correlation of the value in the series. The window overlapping argument is addressed in further detail below.

The parameterization process 302 may also comprise the definition of the architecture of the autoencoder deep neural network itself. In our experiments, due to the relative simplicity of the traces, the best network topology is achieved with two hidden layers, as suggested in the literature. However, as would be apparent to one skilled in the art, for more complex series, deeper networks might be required. Additionally, the proper activation functions and other aspects of the network can be defined a priori based on experimental knowledge of the domain. These parameters may be kept static during the refinement step.

Embodiments of the invention leverage such parameter estimation approaches for the self-adaptive parameterization of the training of autoencoder deep neural networks. The approaches described in the Example at part E hereof constitute an embodiment of the invention, but alternative parameter estimation functions could be used instead, as would be apparent to a person skilled in the art.

In at least some embodiments, the provenance of the data is stored, so as to allow the informed retraining of the DNN 304 in future iterations of the parametrization process 302. An implementation of this is addressed in the Example at part E hereof.

When the parametrization process 302 is triggered after the utility evaluation step, the DNN can be retrained 304 using only reasonably recent data.

With continued reference to FIG. 11, the autoencoder deep neural network training process 304 receives as input the parameterization for the training of the network and, optionally, the architecture of the network itself, and outputs an autoencoder model. This is done by leveraging a technique such as the example described earlier herein.

The training of the autoencoder network 304 requires some preprocessing over the I/O traces data that comprises the training set. The preprocessing may generate a set of windows $W=\{w_i\}_{i=0}^m$ over the aligned multi-channel data. The size of each window in samples, k, relates to the input size of the network. To keep some time-consistency between each window, consider an overlapping δ between consecutive windows, i.e., between $w_i$ and $w_{i+1}$. Once the windows are generated, the values are stacked to compose a matrix that will act as input for training of the autoencoder DNN 304. The autoencoder model is then stored for use in the online stage 504. Metadata is optionally stored that describes the model provenance, such as the data used to train it.

D. Aspects of an Example Online Stage

In general, the online stage 504 takes place continuously as new data is made available by the computational appliance/environment 400. For the purposes of this discussion, it is assumed that a stream of I/O traces is being continuously produced by the computational appliance/environment. Thus, the first process in the online stage 504 is the collection of new I/O trace samples 306. These are collected directly from the computational appliance/environment 400 via monitoring and logging systems.

The collected traces are stored in the I/O traces data 202 repository and processed in a similar fashion as the one described earlier. When a new iteration of the building stage 502 is triggered, these new samples comprise the base that is used for the parameterization process 302 of that building stage 502. The last k traces are composed in a window, in similar fashion to the way described herein in the preprocessing of the training data for the autoencoder DNN. This window comprises the input of the next process.

Next, the process compute encoded feature difference series 308 loads the autoencoder model saved by the autoencoder DNN training process 304 of the building stage. This process 308 receives as input a window of k I/O trace samples composed by the previous processes in the online stage 502 and performs the process described in the discussion of FIGS. 6-10 for generating a feature difference series.

As previously described, each window in the I/O trace stream overlaps with the next by a certain number of samples 8. This guarantees that the differences from one window $w_i$ to the next $w_{i+1}$ represent relevant changes without undue influence of punctual noise or outliers. The overlapping of windows is important in order to minimize the impact of outliers in the original series. Experimental validation by the inventors shows that for the domain of I/O traces, this window should be of around 25% of the window size. It is apparent that the rule for deriving this overlapping parameter is domain dependent. An example of this computation is given in the Example at part E hereof.

With respect now to local maxima detection 310, that process involves analyzing the difference series that is iteratively and continuously built in the previous step. The discussion of FIGS. 9 and 10, for example, describes one approach. The appropriate function for local maxima detection depends on the domain. Since each pair of window encoded main feature arrays correspond to one point in the difference series, the parameter of window size influences the locality of maximal points directly.

One particular embodiment of invention involves use of the algorithm for one-dimensional local maxima by comparison of neighboring values available in the Scipy signal processing library. For domains in which subtle variations in the encoded features represent a breakpoint, techniques more apt for dealing with a high rate of false positives can be used. Various other functions could be applied as would be apparent to a person skilled in the art.

Thus after the local maxima are detected 310, it is possible to compute via the following formula the actual time span in which a breakpoint occurred:

$$t = i \times s, \text{ where } s = (k-\delta),$$

where the resulting timestamp t of a breakpoint is the index of the local maxima in the difference series i times the window step s—that is, the window size k minus the window overlapping δ. An example is addressed in the Example at part E hereof.

With continued reference to FIG. 11, further details are provided concerning the breakpoint utility evaluation process 312. In general, this process continuously evaluates past detected breakpoints as soon as the ground truth is made available. To this end, we leverage the processed I/O traces collected during the functioning of the system over time. This process also, optionally, consumes the difference series for reasoning about a threshold r for discarding redundant breakpoints. The evaluation function allows for the comparison of results over time, even as the historical annotated I/O traces series increase in length. This is important to identify drift between the model and the system.

Several algorithms for computing quality measures of breakpoint detection are available. Many of them are based on a binary classification of each detected breakpoint as correct or incorrect. These measures resemble the typical quality measures of predictive machine learned modes, such as accuracy, sensitivity, F-measure and related measures. Others are based on the time difference between the detected breakpoints and the ground truth, such as mean signed difference, mean squared absolute error and others.

One such metric is the Normalized Root Mean Squared Error (NRMSE). Such metric is constantly evaluated to improve the model parametrization and, consequently, the quality of the detection. If the error, here called E, satisfies a minimum value, the system is able to take operational decisions about the behavior of the IO Traces, since the breakpoints are correctly detected accordingly to the trained model.

The error function $\in$ is defined as $$\in = \frac{\sqrt{\sum_{i=0}^{B}(x_i - \bar{x}_i)^2}}{xmax - xmin}$$

Thus, the main objective is to find the set $\{\bar{x}i\}B_{i=0}$ that minimizes $\in$. Note that, using this metric, the error could be directly compared to the threshold—that is, if $\in > \tau$, it is necessary to improve the chosen parametrization. Experiments by the inventors show, however, that the metrics shown in some of the literature are not entirely appropriate for the domain of I/O trace series, since small differences in time do not invalidate a detected breakpoint as completely incorrect. Thus, resort is made to another kind of measurement in which the distance—in time units—of the detected breakpoints from the actual ground truth breakpoints are taken into consideration. This is the case of the NRMSE described above, but it considers only the true-positive aspect of the domain: that is, it measures and favors correctly placed breakpoints but does not penalize spurious breakpoints. In the domain of I/O traces, the kinds of decision making that rely on segmentation and breakpoint detection are disadvantaged when spurious breakpoints are detected.

Hence, a utility evaluation function is presented here that is appropriate for the domain of I/O trace time series breakpoint detection. The evaluation considers both the true-positive as well as the false-positive aspects. The evaluation is based on two factors, defined as follows:

True-positive factor ("Factor A"): the sum of the distances (in time units) from each ground truth point to the closest discovered breakpoint, divided by the length of the series; and False-positive factor ("Factor B"): the sum of the distances (in time units) from each discovered breakpoint to the closest ground truth point, divided by the length of the series.

Note that both factors are divided by the length of the series, in time units. This is desirable to allow comparison between scores obtained datasets, for example, and to compare recent, short-scoped evaluations with long-term past historical evaluations. Then, the evaluation of the set of discovered breakpoints is computed as the weighted multiplication of both factors.

Formally, let $\mathbb{Q} = \{q_0, q_1, \ldots, q_n\}$ be non-empty the set of timestamps of ground truth points, that is, points that are known from domain knowledge to be relevant breakpoints. That is, $q_i$ is the timestamp in the original multi-channel series (I/O trace) of the i-th true breakpoint. Similarly, let $\mathbb{B} = \{b_0, b_1, \ldots, b_m\}$ be the non-empty set of detected breakpoints. Finally, let T be the time span of the multi-channel series under consideration. In at least one embodiment of this invention, this span is defined as $T = \max(q_n, b_m) - \min(q_0, b_0)$, as this defines the period under consideration. Then:

$$A = \frac{\sum_{i=0}^{|\mathbb{Q}|}\sqrt{(q_i - b_x)^2}}{T}$$

where $b_x = \text{argmin}(q_i - b_x), \forall b_x \in \mathbb{B}$.

Conversely:

$$B = \frac{\sum_{i=0}^{|\mathbb{B}|}\sqrt{(b_i - q_x)^2}}{T}$$

where $q_x = \text{argmin}(b_i - q_x), \forall q_x \in \mathbb{Q}$.

And the resulting evaluation $\in$ is a weighted composition of both factors given a weighting score σ that dictates the importance of the true-positive aspect of the domain over the false-positive aspect. Various embodiments of this weighted evaluation are possible. For example:

$$\mathcal{E} = \sigma^A \times (1-\sigma)^B \quad (1)$$

With $0 \leq \sigma \leq 1$, this evaluation has the advantage of transforming a distance metric into a proper utility score, in which higher values indicate a higher quality. Furthermore, the resulting score is constrained between zero and one, which facilitates the comparison between evaluations. Other evaluations are possible, however. For example, an alternative form $\mathcal{E} = \sigma A + (1-\sigma)B$ has the advantage of degenerating to the standard RMSE metric presented in the literature when $\sigma = 1$. In the domain of I/O trace time series, we use definition (1) (above) and define $\sigma$ as 0.5, as both aspects have equivalent importance for decision making. Following are examples and discussion of the metric against four typical cases.

Figure 12:
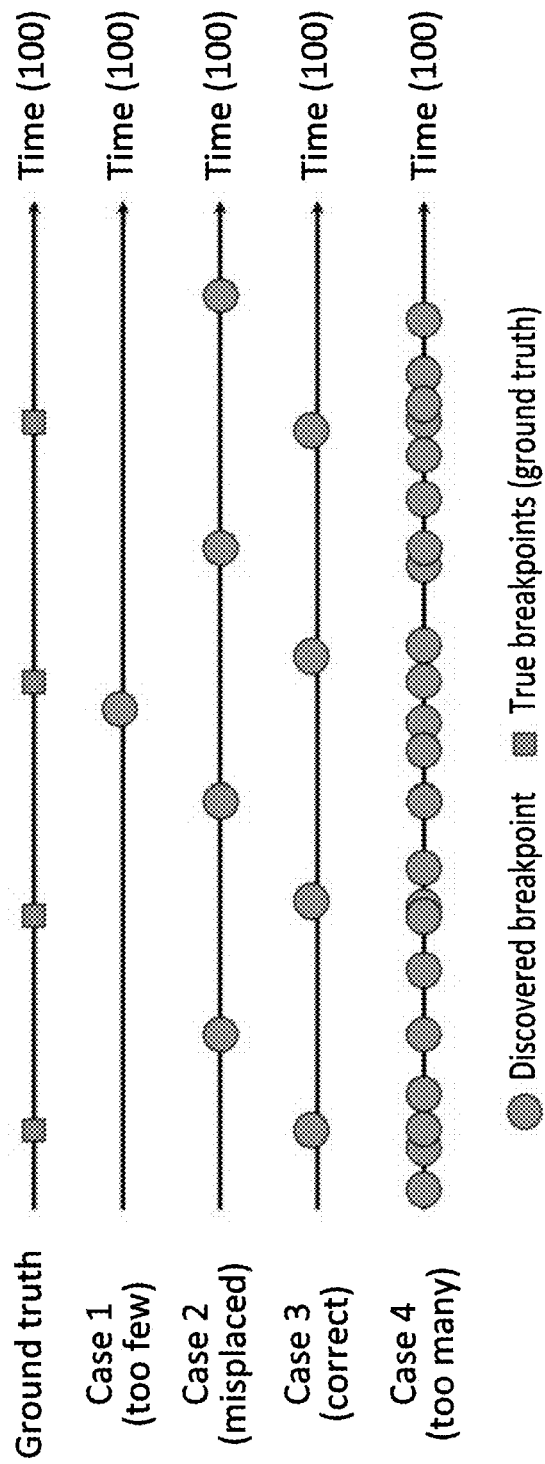
FIG. 12 discloses an example case for breakpoint utility evaluation.

Turning first to FIG. 12, an example of four cases for the breakpoint utility evaluation is disclosed. The calculation of Factor A and Factor B for each such case is demonstrated below. In all figures the value of T is considered to be 100, following the example above.

Figure 13:
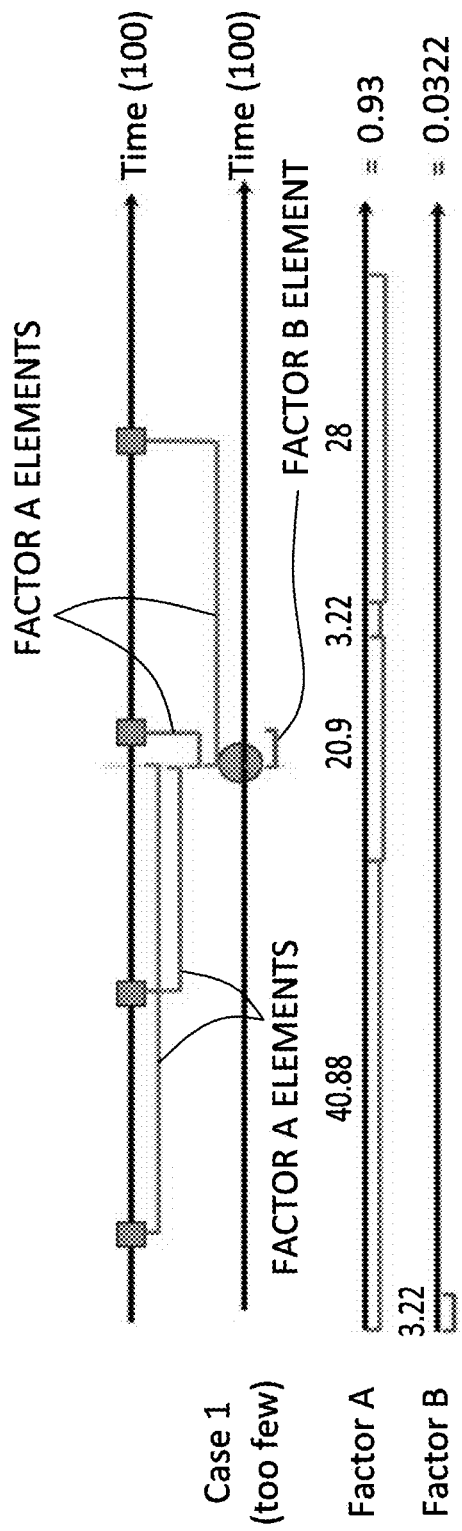
FIG. 13 discloses a visual representation of computation of Factor A and Factor B for a first example breakpoint utility evaluation.

FIG. 13 is a visual representation of the computation of Factor A and Factor B for the first example case and discloses how the distances from each ground truth point account for a high value of Factor A. As shown, various Factor A elements and Factor B elements are used in the determination of the values of Factor A and Factor B, respectively. In this example, since there is only one detected breakpoint, and it is very close to an actual ground truth point, the false-positive aspect (Factor B) is very small. The resulting evaluation of this set of breakpoints, using definition (1) is 0.51.

Figure 14:
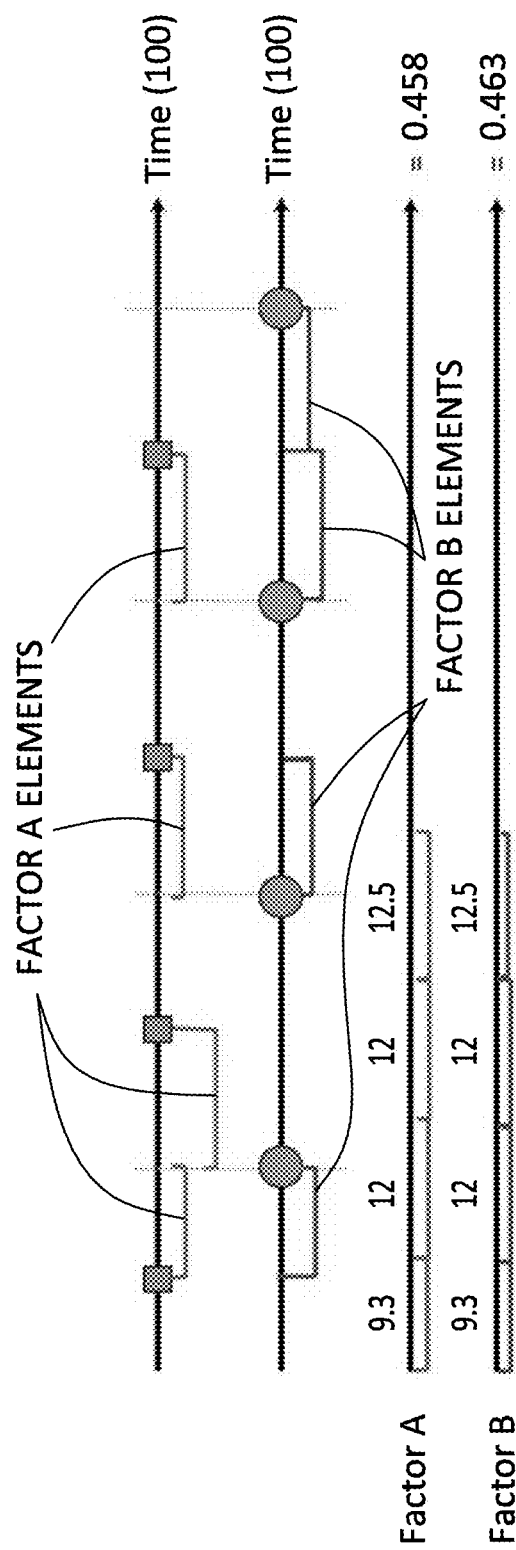
FIG. 14 discloses a visual representation of computation of Factor A and Factor B for a second example breakpoint utility evaluation.

FIG. 14 shows the same for the second scenario, in which breakpoints are annotated misplaced in time. In this case, the resulting evaluation is 0.52. Hence, even though this scenario differs significantly from that in FIG. 13, the resulting evaluation is roughly equivalent. This reflects the fact that the metric penalizes both the misplacement as well as the non-detection of breakpoints.

Figure 15:
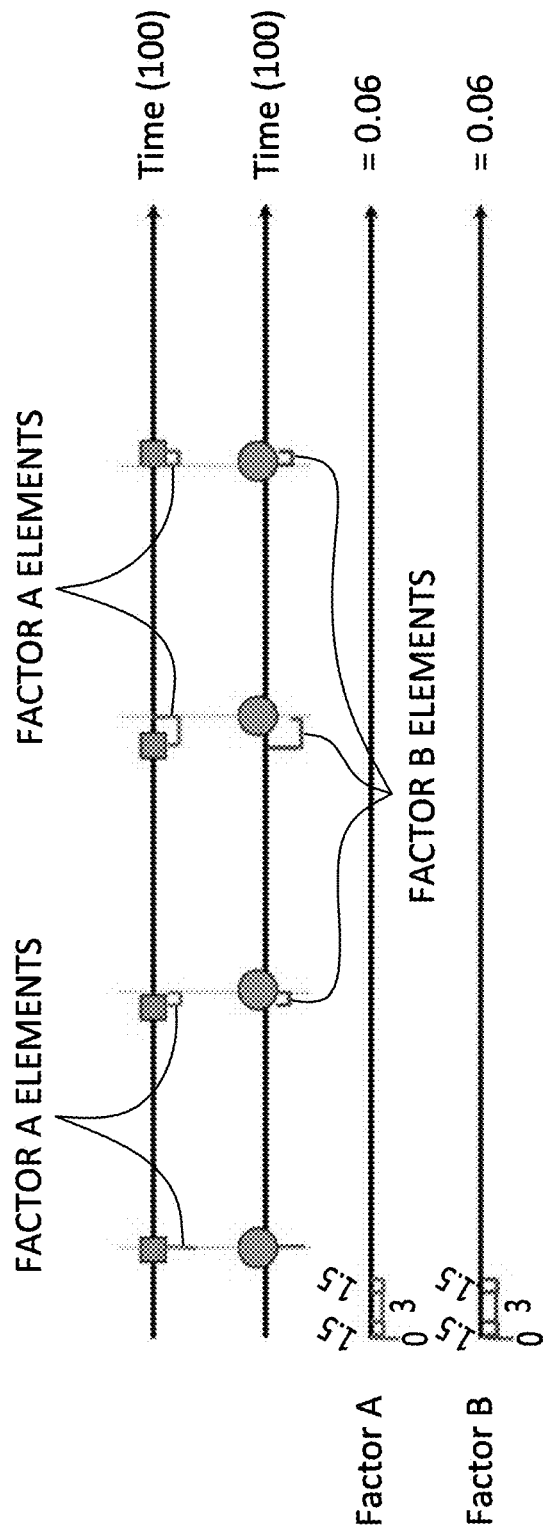
FIG. 15 discloses a visual representation of computation of Factor A and Factor B for a third example breakpoint utility evaluation, in which breakpoints are close to equal to the ground truth.

In FIG. 15, it is shown how the correct placement of breakpoints yields a higher value for the metric. That is, FIG. 15 is a visual representation of the computation of Factor A and Factor B for the third example case, in which breakpoints are close to equal to the ground truth. The resulting evaluation is 0.92 in this case, close to a perfect score of 1.

Figure 16:
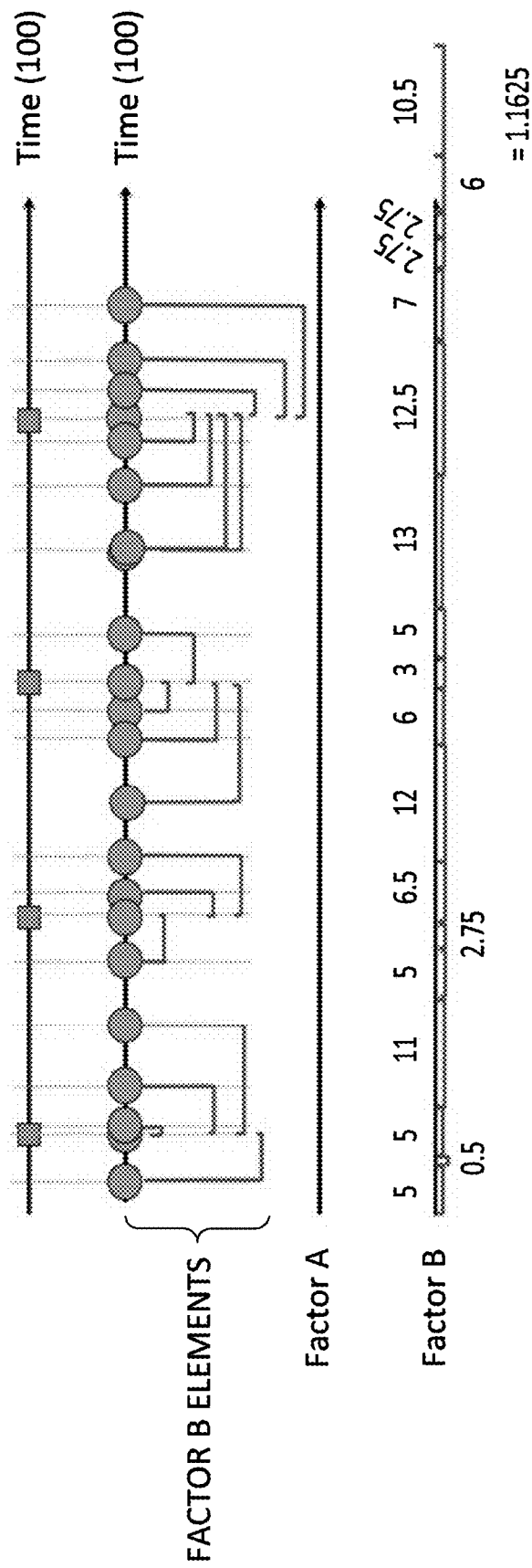
FIG. 16 discloses a visual representation of computation of Factor A and Factor B for a fourth example breakpoint utility evaluation involving spurious breakpoints.

The last example case is shown in FIG. 16, which provides a visual representation of the computation of Factor A and Factor B for the fourth example case, in which despite a perfect assignment of breakpoints to the ground truth, too many spurious breakpoints are also detected. This final example showcases how false-positives are taken into account in our evaluation. In this case, so many breakpoints are detected that all ground truth points have an exactly equal detected breakpoint. Hence, Factor A is equal to zero. In the true-positive aspect, this set of breakpoints is perfect. However, many spurious breakpoints are present. The sum of the distances of these breakpoints to the closest ground truth points in fact exceeds the length of the series, yielding a Factor B of 1.1625. Even though Factor A is zero, the resulting evaluation is 0.44, worse than all other scenarios.

After evaluating the recent breakpoints with an appropriate metric, the quality of those breakpoints is annotated in the breakpoint repository or database 208. Thus the breakpoint database 208, over time, comprises a series of the observed utility of the breakpoints detected in the domain.

Additionally, the recent breakpoints utility is compared to the historical utility of the breakpoints generated by the current Autoencoder DNN. If a consistent drop in utility is observed, either sharp or continuous depending on the domain, this means that the system has drifted to a mode not captured by the model. Hence, this process triggers the re-parameterization 302 for the generation of a new autoencoder DNN when a certain utility threshold is consistently not met. On the other hand, if the utility of the breakpoints detected is consistently comparable to the historical quality of the breakpoints generated by the current autoencoder DNN, the breakpoint is reported to the operational stage 506. Examples of the results of the evaluation of breakpoints with this metric are given in the Example at part E hereof.

E. Aspects of an Example Operational Stage and Method Application

Before addressing an example application of an embodiment of the method, some brief remarks are presented concerning the operational stage 506. In this regard, it is noted that, in the operational stage 506, the computational appliance/environment 400 is continuously monitored, and new I/O traces are collected iteratively. Furthermore, the operational actions are completely domain-dependent. The breakpoints reported for whatever decision-making system comprises the operational action in the diagram of FIG. 11. In the scope of I/O traces time series, this decision making typically configures anomaly detection, cache policy parameterization, among others. Some examples of operational actions that leverage breakpoint detection are: automatic tuning of the storage appliance to optimally satisfy application requirements; data prefetching configuration; cache policy adaptation; and, automated anomaly detection.

With continued reference to FIG. 11, and directing attention now to FIGS. 17-30, details are provided concerning an example implementation of various aspects of one or more embodiments of the invention. In general, this discussion demonstrates the application of the method over a domain of hits and pollution time series derived from a cache policy and raw I/O traces from a PowerMax appliance as computational environment. The concept is exemplified with tailored data derived from real production I/O traces. That is, an appropriate input series was chosen, and handmade 'ground truth' to showcase the method. IN general, the following are described in an order of execution and related to the processes of the proposed approach set forth in FIG. 11. Thus, the discussion subsections below correspond to those processes pictured in FIG. 11.

Reference is first made to I/O traces data 202, that is, historical data. In general, these traces comprise data regarding the cache policy results over time. The hit-rate and the cache pollution are computed over time yielded by a cache policy over real data collected from production systems. The hit-rate and pollution series are both measured in pages per second. The hit-rate comprises two channels: hits-request, the cache hits naturally following from repeated requests in pages held in the cache; and, hits-prefetch, the cache hits stemming from prefetched pages, as determined by the policy. The cache pollution comprises a single channel: pollution, the number of prefetched pages that are evicted without resulting in cache hits.

Figure 17:
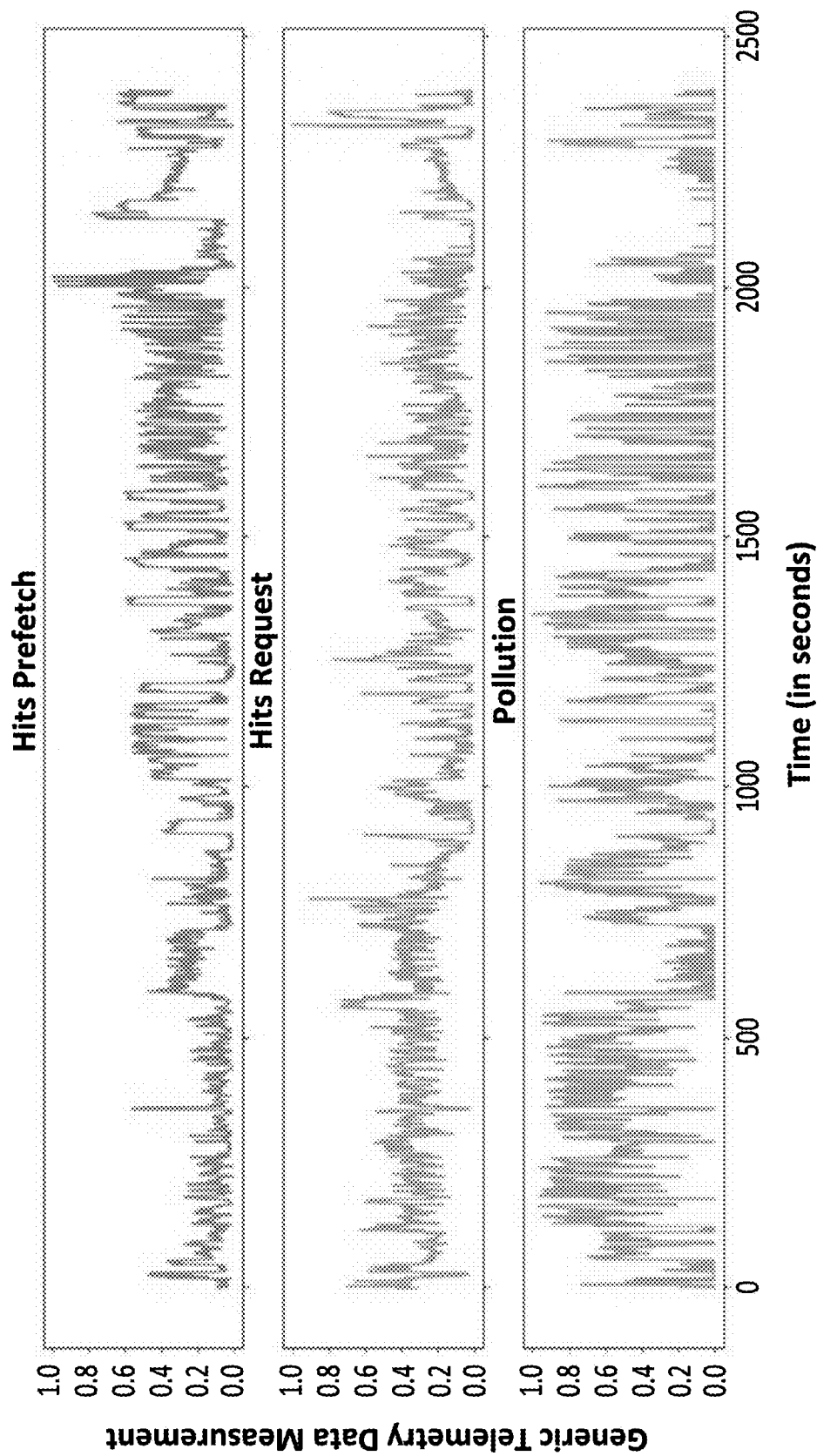
FIG. 17 discloses cache hits and pollution in a benchmark example.

FIG. 17 discloses a normalized series for a simplified implementation of the PowerMax cache policy, and indicates the resulting cache hits and pollution in a benchmark example comprising 40 minutes of workload over 1 hour of data. This policy performs all prefetches with a fixed value for the look-ahead, in pages. However, this policy only performs prefetching upon detecting 'sequential' requests. A request is considered sequential when the immediately preceding page-address address is in the cache.

Reference is next made to various concepts concerning parameterization. In general, a demonstrative method is provided for determining an appropriate pattern length in the domain example of breakpoint detection for cache policy optimization. Given an understanding of the domain, workloads accessing the storage system are classified as either sequential, when prefetching is essentially beneficial, or random, when prefetching is more likely to generate cache pollution. An example of the method proceeds as follows: (1) collect an appropriate subset of the input series comprising the most recent data as a subseries; (2) obtain the 'sequential' data points in that subseries—since in the hit and pollution series, each point represents a second, the inverse pollution is used as a score and a threshold is applied—a data point can be considered to be 'sequential' if the pollution is below the 5th percentile of the historical series; (3) clusterize these points by their proximity, so as to obtain the most representative starting and ending points of each sequence 'sequential period' of low and, conversely, high pollution; and, (4) compute the average length of 'sequential periods' in the subseries.

In the domain for this example, this average length of sequential periods corresponds to the pattern-length for the parametrization of the autoencoder network. These points are later used as illustrative 'ground truth' breakpoints for the utility evaluation of the discovered breakpoints.

Figure 18:
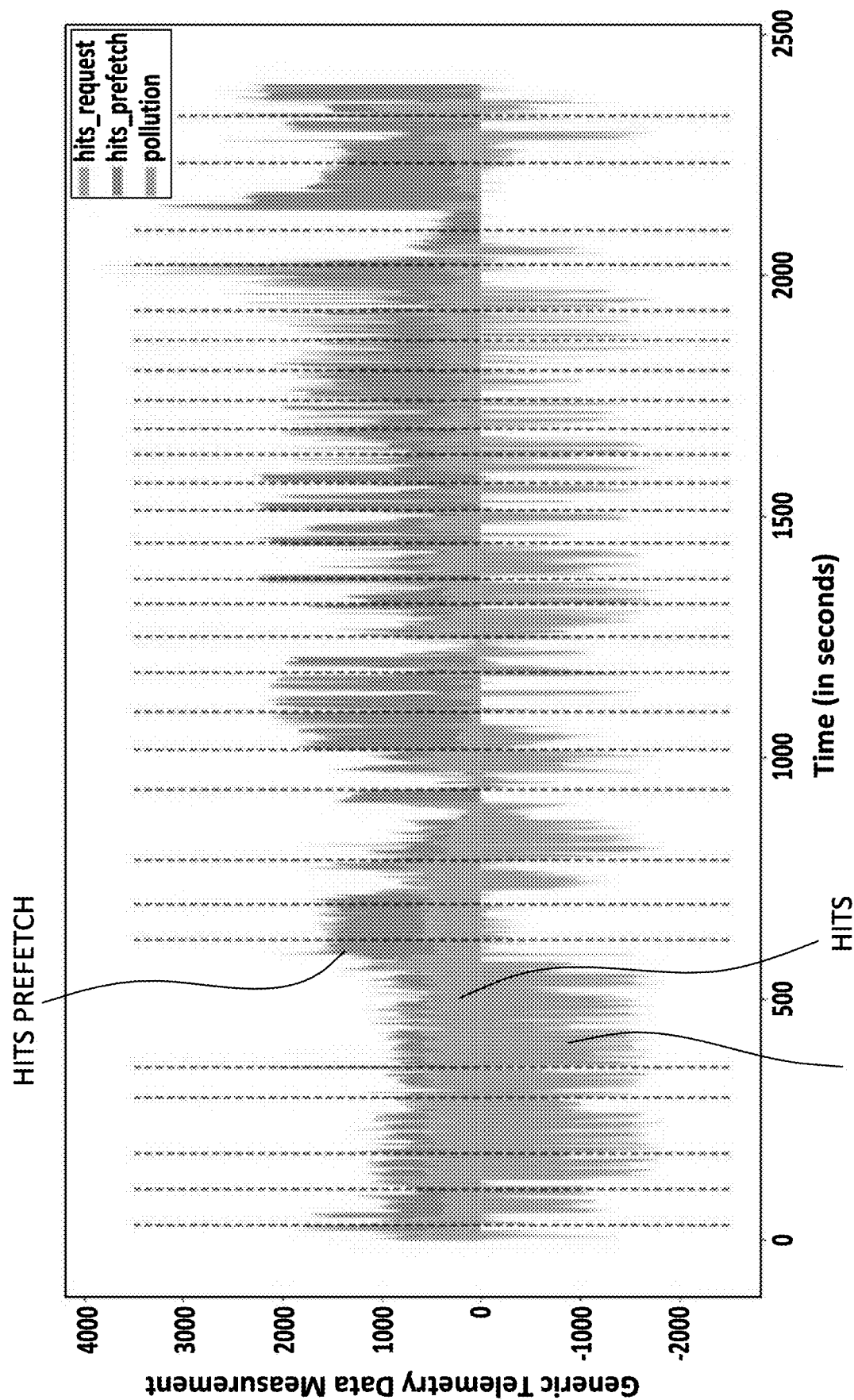
FIG. 18 discloses stacked hit and pollution series corresponding to a specified workload.

In FIG. 18, the hit and pollution series are shown for 40 minutes of operation of a PowerMax appliance. The sequential periods are signaled by the vertical dotted lines. This comprises the 'subseries' from the processes (1) through (3) described above. The 5th percentile (from process (2)) in this case is zero, since there are many data points with zero pollution. The vertical dotted lines represent the centers of the clusters obtained in process (3). The average length obtained is 80 samples. Taking into consideration that the local maxima detection range is 10 samples, 8 samples are obtained as an initial estimate for the window size in the training of the autoencoder DNN. In general, a rule of thumb is that the window overlapping argument must be about 25% of the window size. The window overlapping is thus defined as 2 samples.

Figure 19:
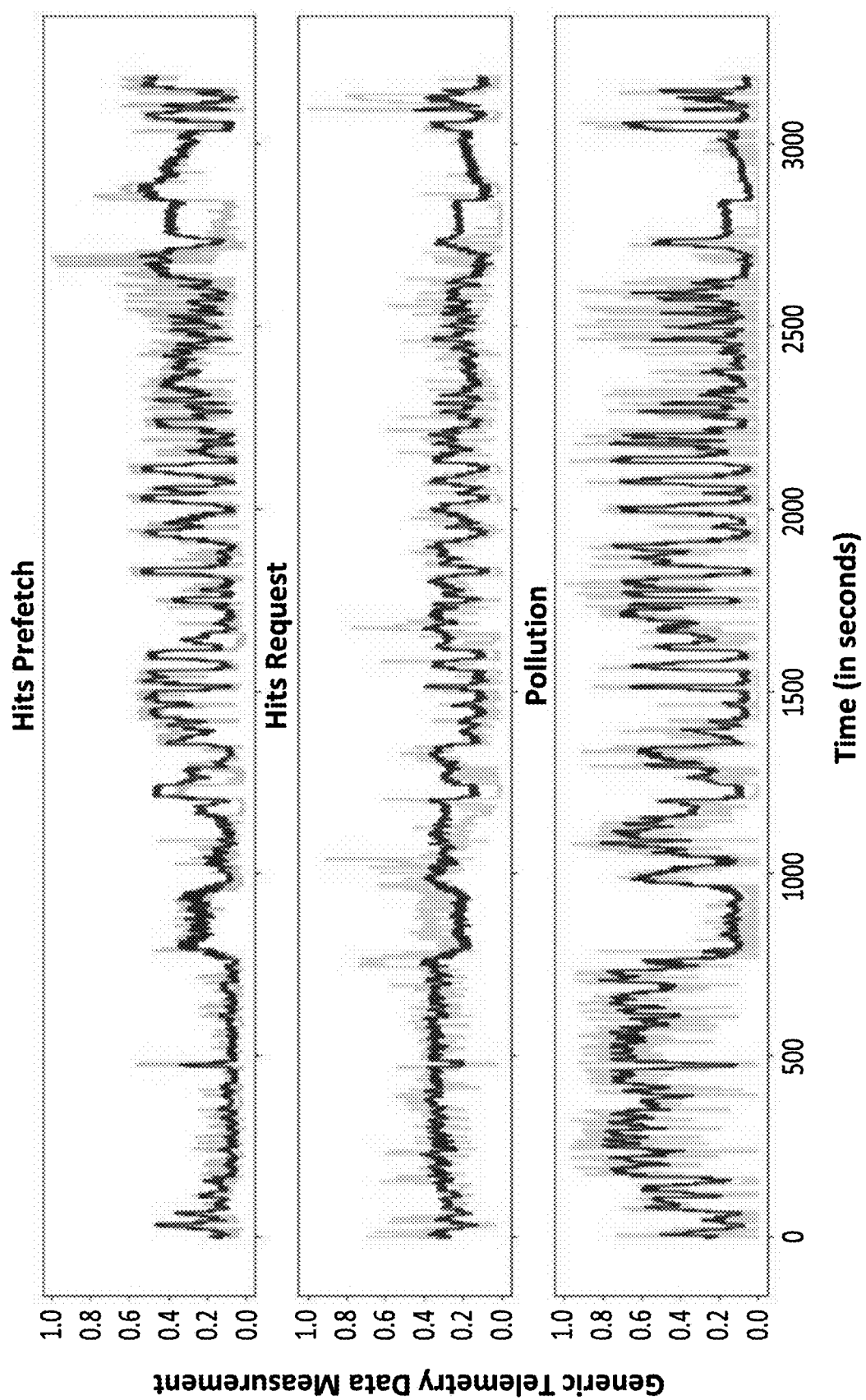
FIG. 19 discloses a reconstructed series in the cache hit and pollution series, as resulted by an autoencoder DNN.

Reference is next made to Autoencoder DNN training 304, as shown in FIG. 11. The autoencoder DNN is trained with a stochastic gradient descent optimizer and mean squared error as the loss function. The data is fit over the 40 minute samples from FIG. 17, with shuffling, over two thousand epochs, in batches of 16 samples with shuffling. A validation data loss of 0.0184 was obtained. FIG. 19 shows the reconstructed signal for the example case. Reconstructed signals are shown in bold, with the original signals in the background.

Figure 20:
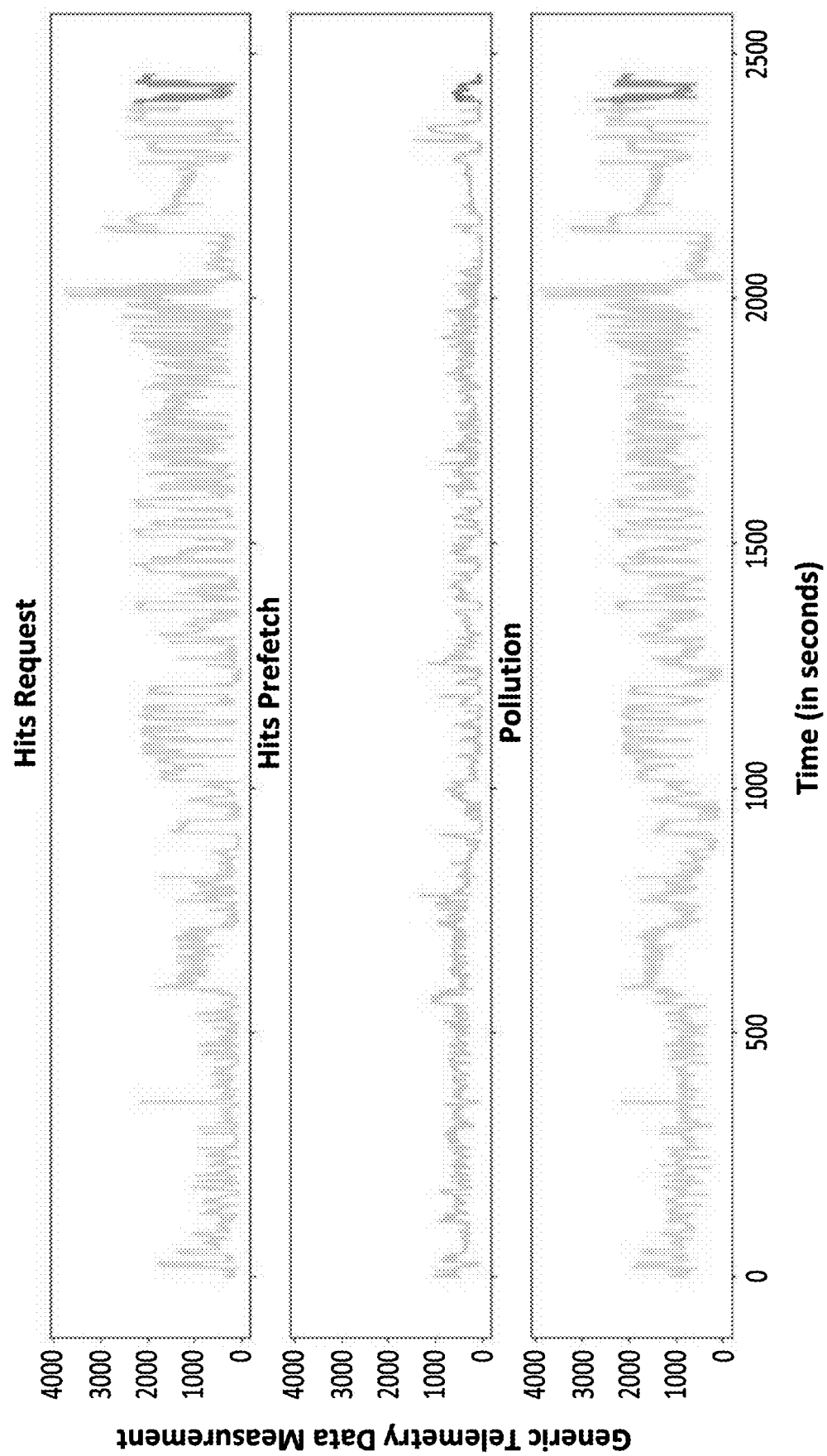
FIG. 20 discloses an additional minute of samples collected from the computational environment.

The next part of this discussion concerns collection of new I/O traces 306, as indicated in FIG. 11. As previously described, in a real application of the approach, this new data comprises a granular, and frequent, collection of I/O traces or processed I/O traces, so as to allow for the online detection of breakpoints. Every window of k samples is passed to the compute encoded feature difference series 308 and local maxima detection 310 processes. In a real application of the approach, this new data would comprise a much more granular, and more frequent, collection so as to allow for the online detection of breakpoints. Recall that in the example, the window size k is 8 samples. In order to more easily exemplify the concept, attention is directed to the example to where a full minute of data is collected, that is, 60 samples. FIG. 20 shows the data with an additional minute of samples highlighted.

Figure 21:
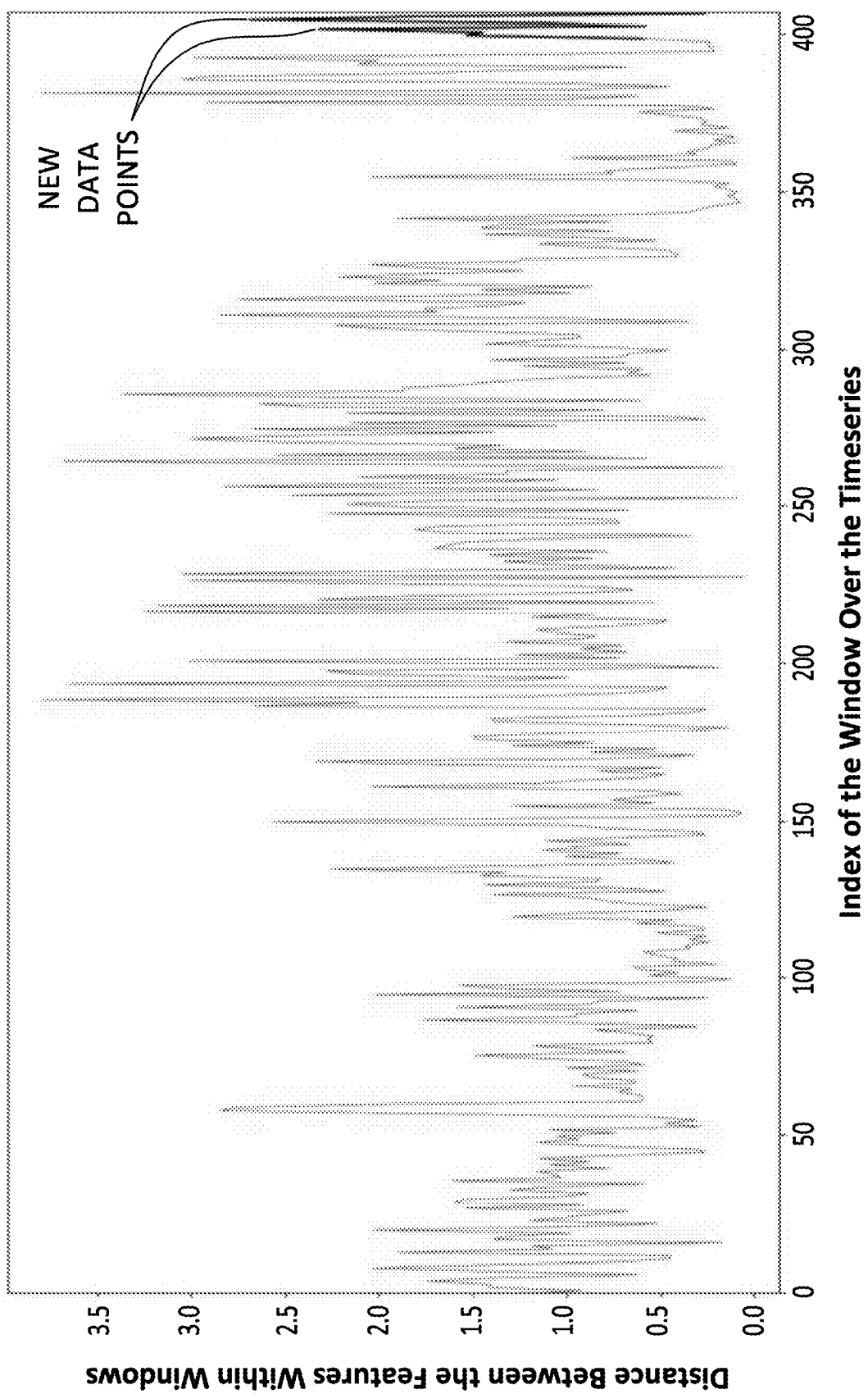
FIG. 21 discloses a difference series comprising new data points.

The next process to be addressed is the compute encoded feature difference series 308. The additional k-samples comprising a window would generate a single additional point in the difference series. Here, since the example is using one minute of collected samples, there are 10 new points in the difference series, that is, 60 new samples divided by s, the window step (see the discussion of the local maxima detection above). FIG. 21 shows the complete difference series with the 10 new points highlighted.

Figure 22:
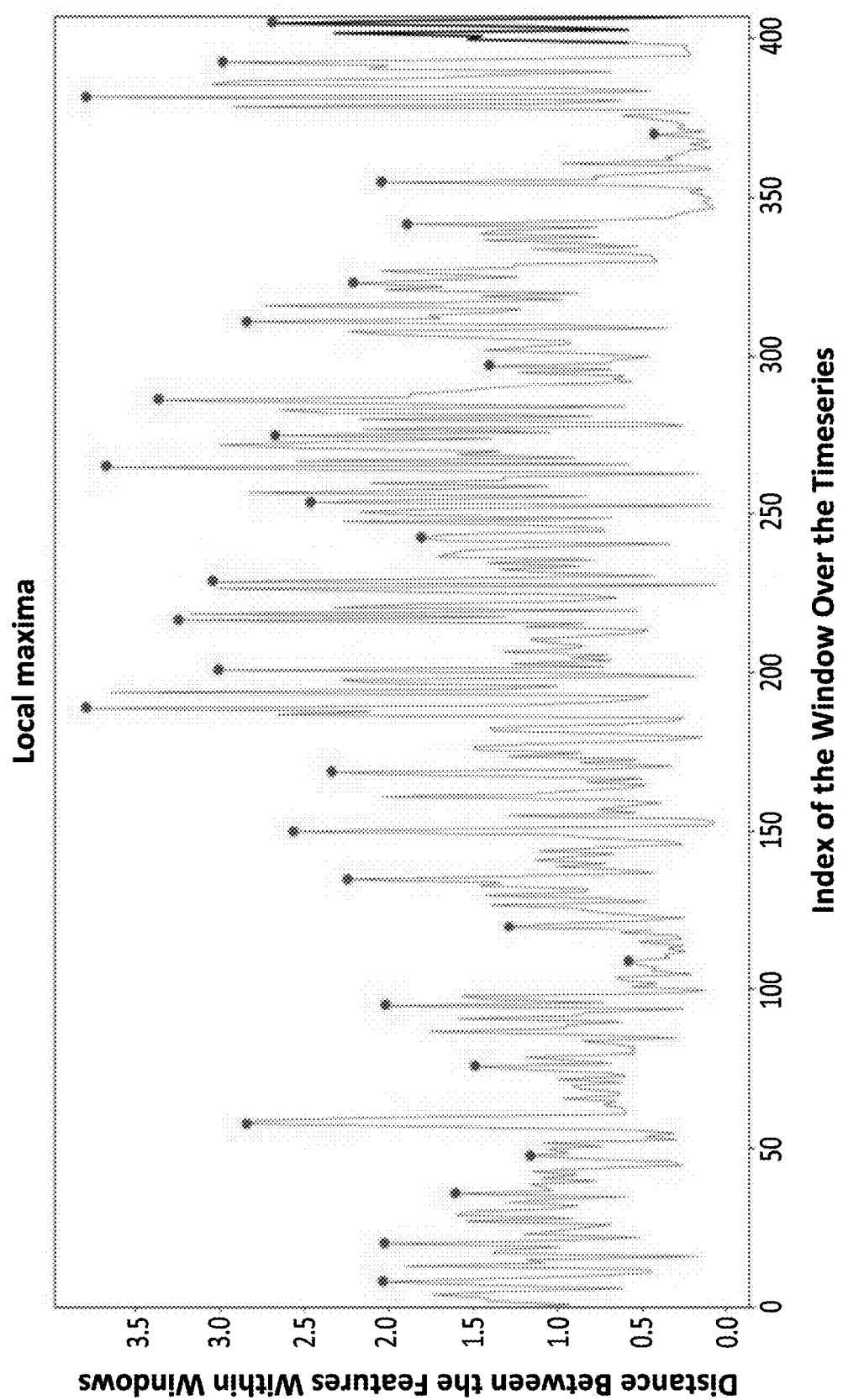
FIG. 22 discloses an additional breakpoint detected.

With continued reference to the Figures, including FIG. 11 and FIG. 22, details are provided concerning the local maxima detection process 310, in which the difference series with additional data is checked for local maxima as described earlier herein in the discussion of local maxima detection. This particular example employs that algorithm, and additionally applies a threshold of zero, that is, all detected peaks are considered breakpoints. This approach, while somewhat simplistic, is adequate for the simplified domain of the present example, and shows how a breakpoint is detected in the additional minute.

Figure 23:
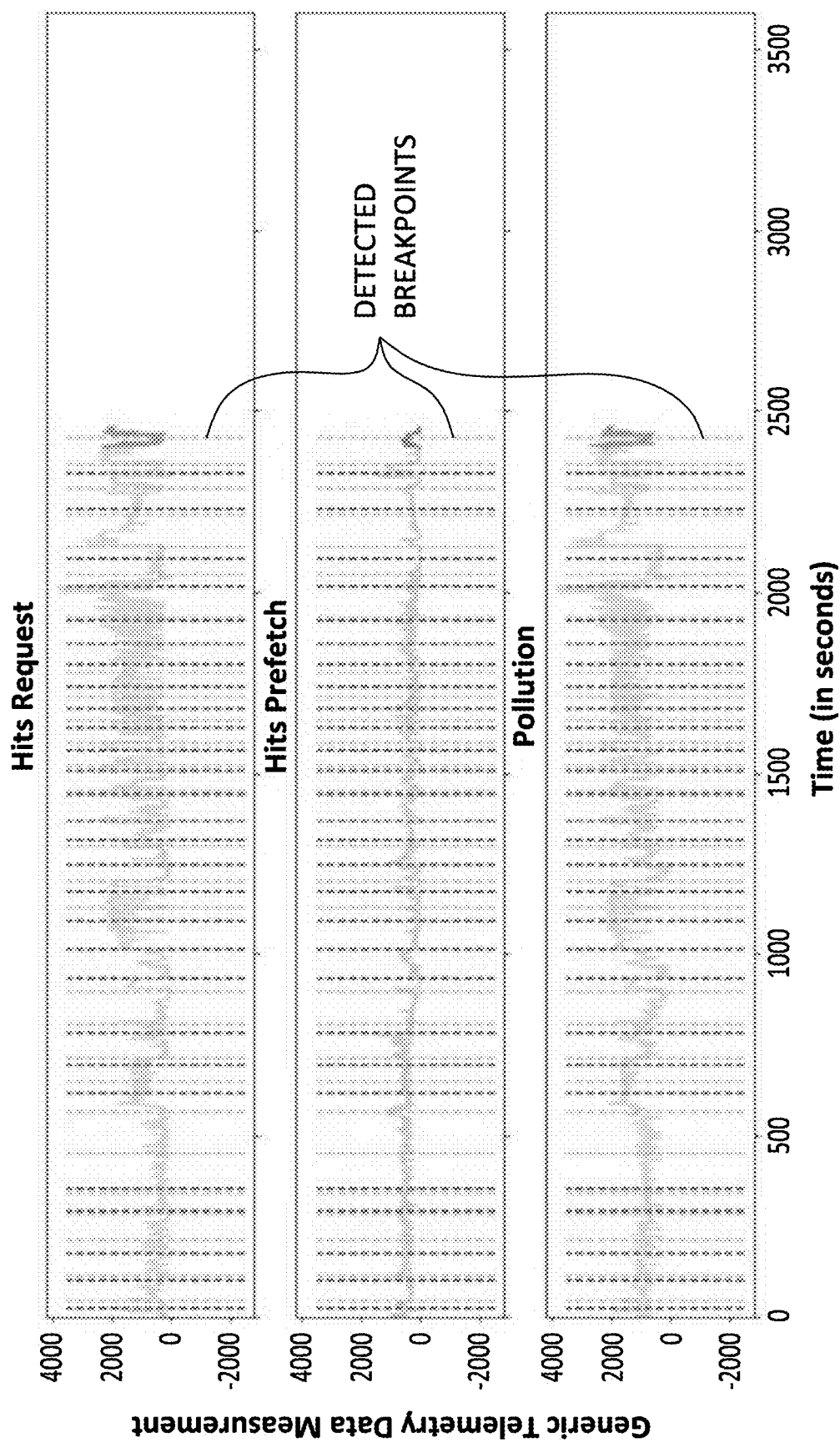
FIG. 23 discloses detected breakpoints over the ground truth for a set time frame (the X-axis has a scale of a 1 hour time period).
Figure 24:
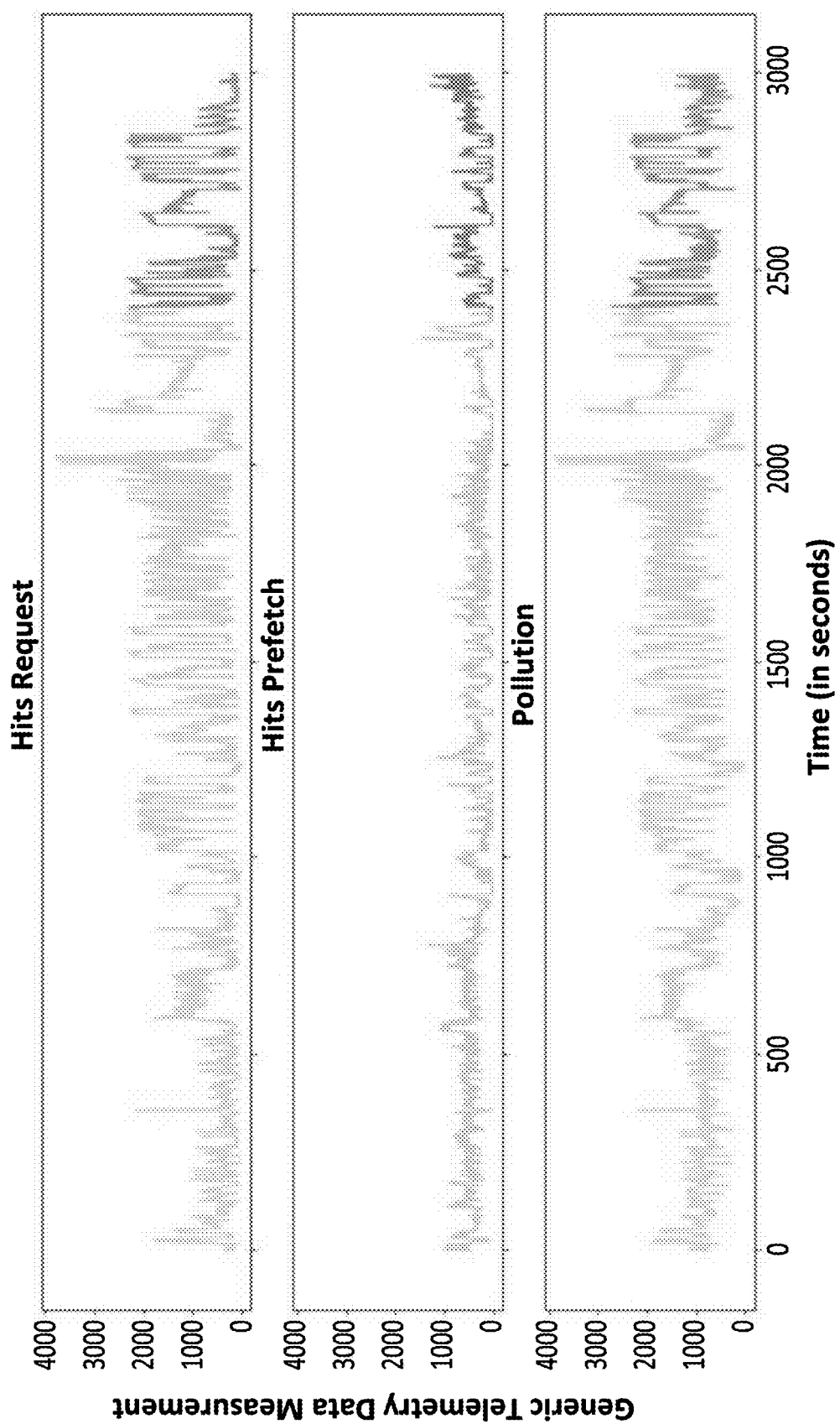
FIG. 24 discloses an additional 10 minutes of data collected from the computational environment.

FIG. 23 discloses the hit and pollution series with the 'ground truth' for the breakpoints superposed in black. The detected breakpoints are shown over the 'ground truth' for the first 40 minutes of data. This Figure is shown in the scale of a 1 hour period on the x-axis, so as to allow comparison with the FIG. 28, discussed below. These ground truth points are the points, described in the parametrization section, above, that mark the 'sequential periods' of page requests. They roughly correspond to the points at which it would have been optimal to reparametrize the cache policy. Also in FIG. 23, the detected breakpoints are shown in the lighter colored broken lines.

It can be seen in FIG. 23 that there is a rough correspondence, meaning that the breakpoints are representative of the periods. According to our evaluation metric described the discussion of the breakpoint utility evaluation above, this set of breakpoints achieves a utility score of ~0.6786 (for A=~0.3223, B=~0.2369 over 2460 samples).

Figure 25:
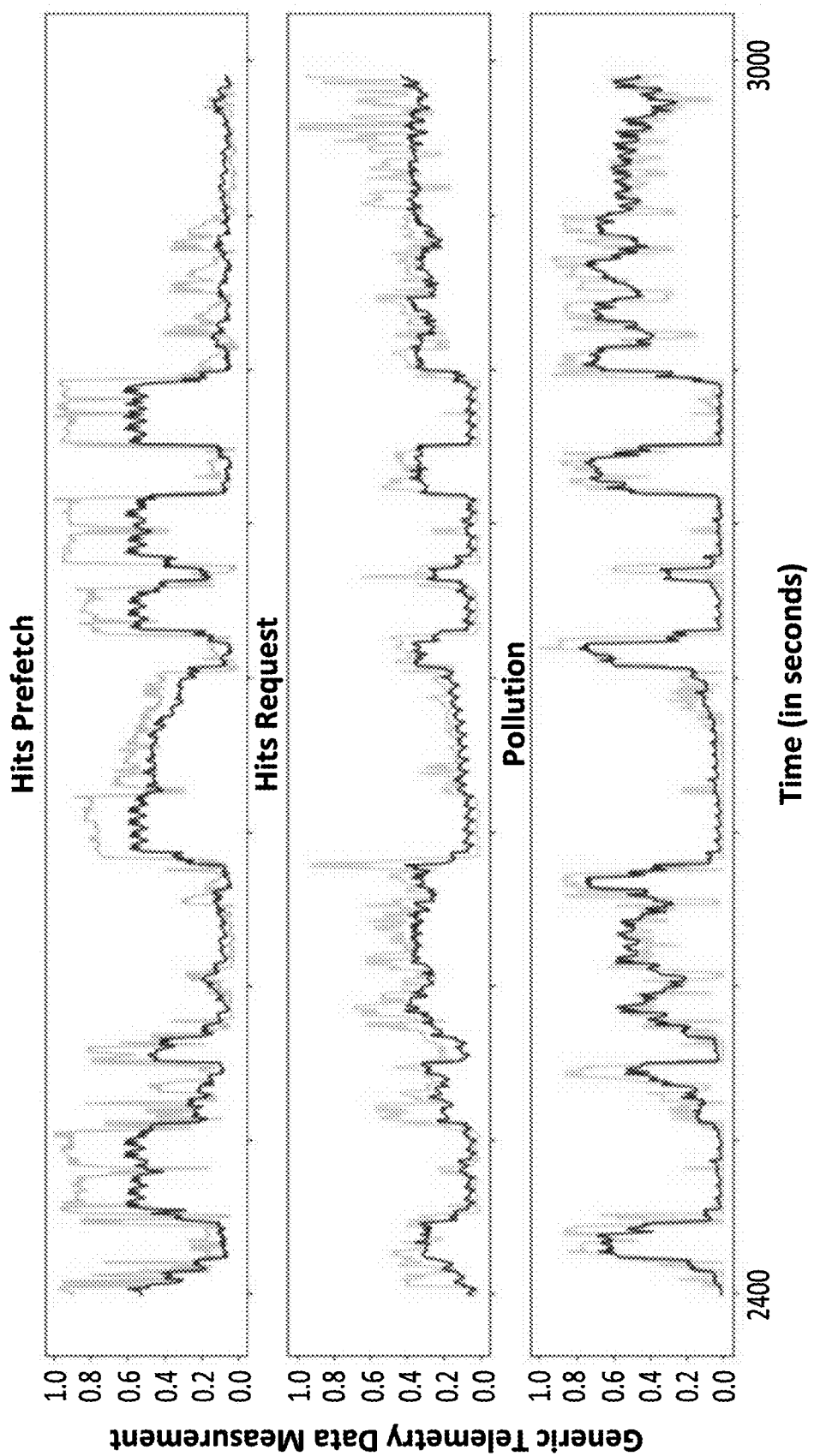
FIG. 25 discloses reconstruction of a series by an autoencoder about 10 minutes after its training.
Figure 26:
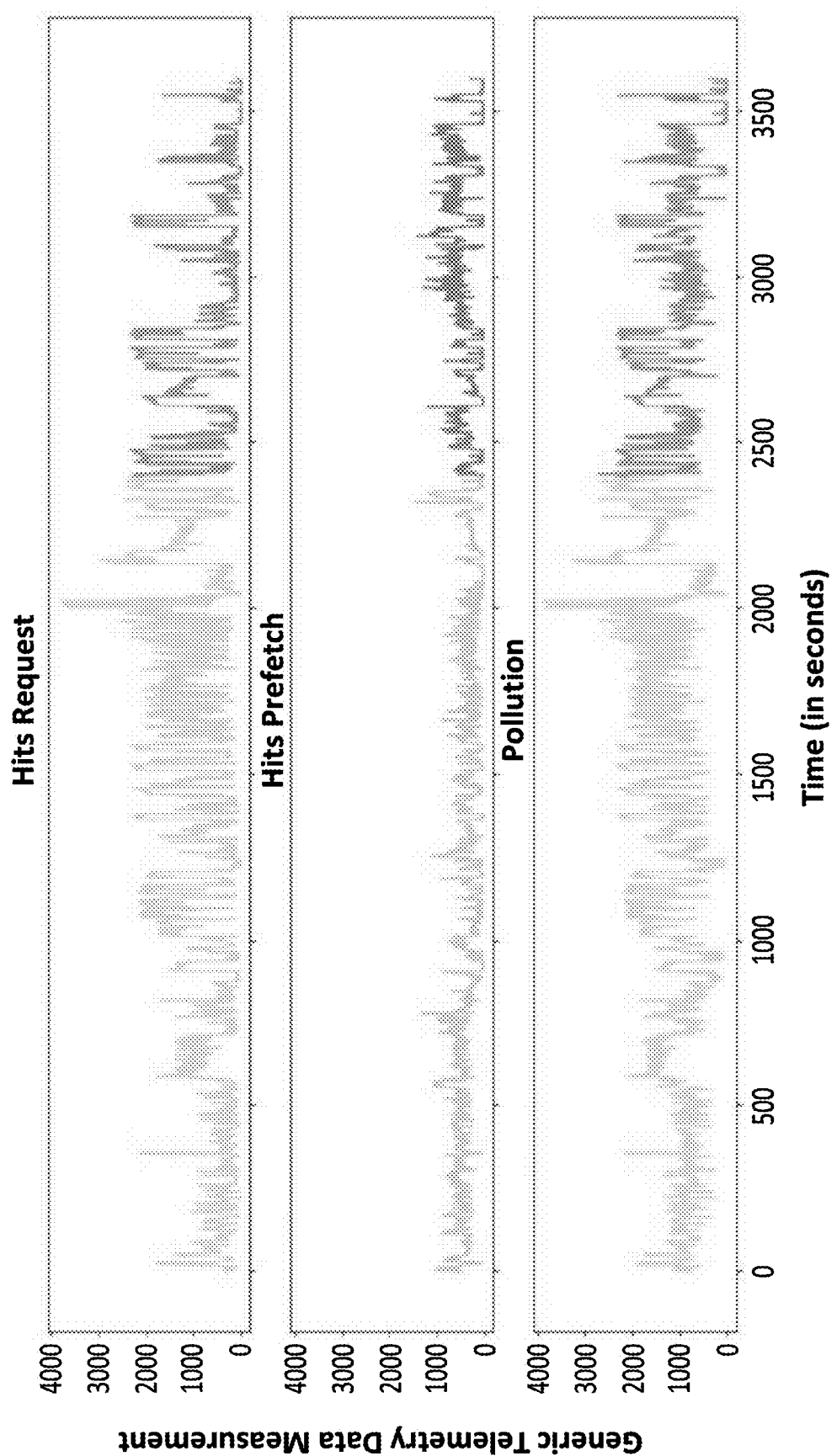
FIG. 26 discloses 20 minutes of data collected after training of the autoencoder.
Figure 27:
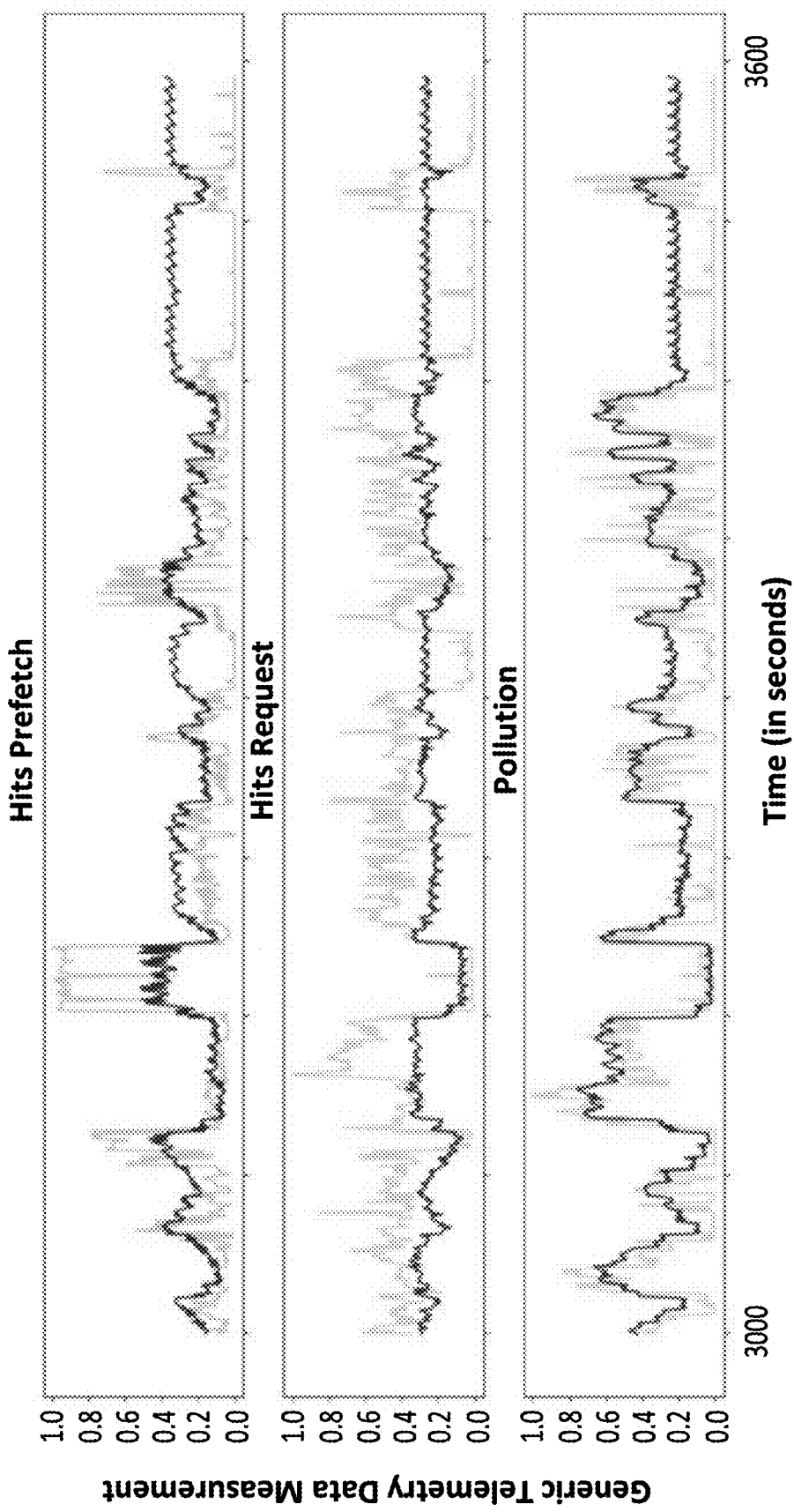
FIG. 27 discloses reconstruction of the series from 10 minutes to 20 minutes after training of the autoencoder DNN.

Following is further discussion of the FIG. 11 processes of operational action 314, and collection of new I/O traces 306, introduced earlier. This example includes leveraging the breakpoints detected in the processed I/O traces series to trigger the re-parameterization of a cache policy. With respect to the process of the collection of new I/O traces 306, suppose that after the collection of an additional 10 minutes, the data shown in FIG. 24 has been collected. It is noted that, up to this point, the originally trained autoencoder DNN is still fit. This is demonstrated by its capability of reasonably reconstructing the series up to 10 minutes after its training in the present example. Particularly, FIG. 25 shows the reconstruction of the signal of the hit and pollution processed I/O traces for these 10 minutes of data.

In this example, after 10 minutes of execution, the cache policy changes drastically. Suppose collection of another 10 minutes of data, for a total of 20 minutes after the training of the autoencoder DNN 304. This data is shown below in FIG. 26.

Figure 28:
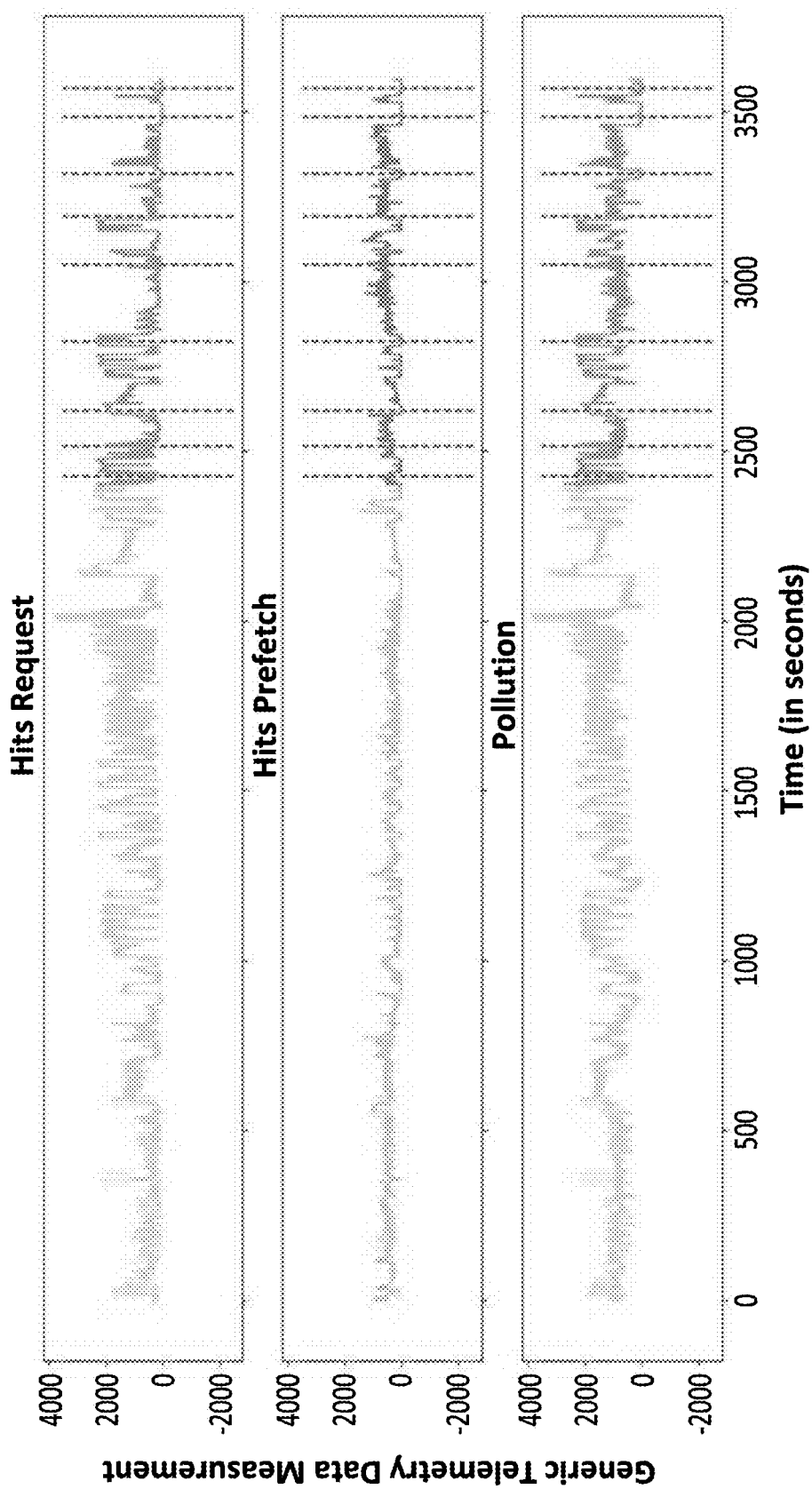
FIG. 28 discloses the ground truth points over the last 20 minutes of data.

However, since the domain has drifted, the autoencoder DNN slightly loses its ability to reconstruct the series with fidelity. To illustrate this, the reconstruction of the period from 10 to 20 minutes of data after the training of the autoencoder DNN is exemplified in FIG. 27. Due to the changes in the domain, the autoencoder progressively loses its ability to correctly reconstruct the original signal. Especially at the tail end of this period, the autoencoder DNN ceases to identify the relevant features for the reconstruction of the series. This will impact the ability of the technique of detecting the breakpoints, as will become apparent in the utility evaluation, discussed below. Finally, assume that after this period of 20 minutes, with the input of domain knowledge, either manually or as the result of post-processing, the 'ground truth' is obtained for this period. As before, the 'ground truth' points are shown in FIG. 28 in black broken lines superposed over the series.

Figure 29:
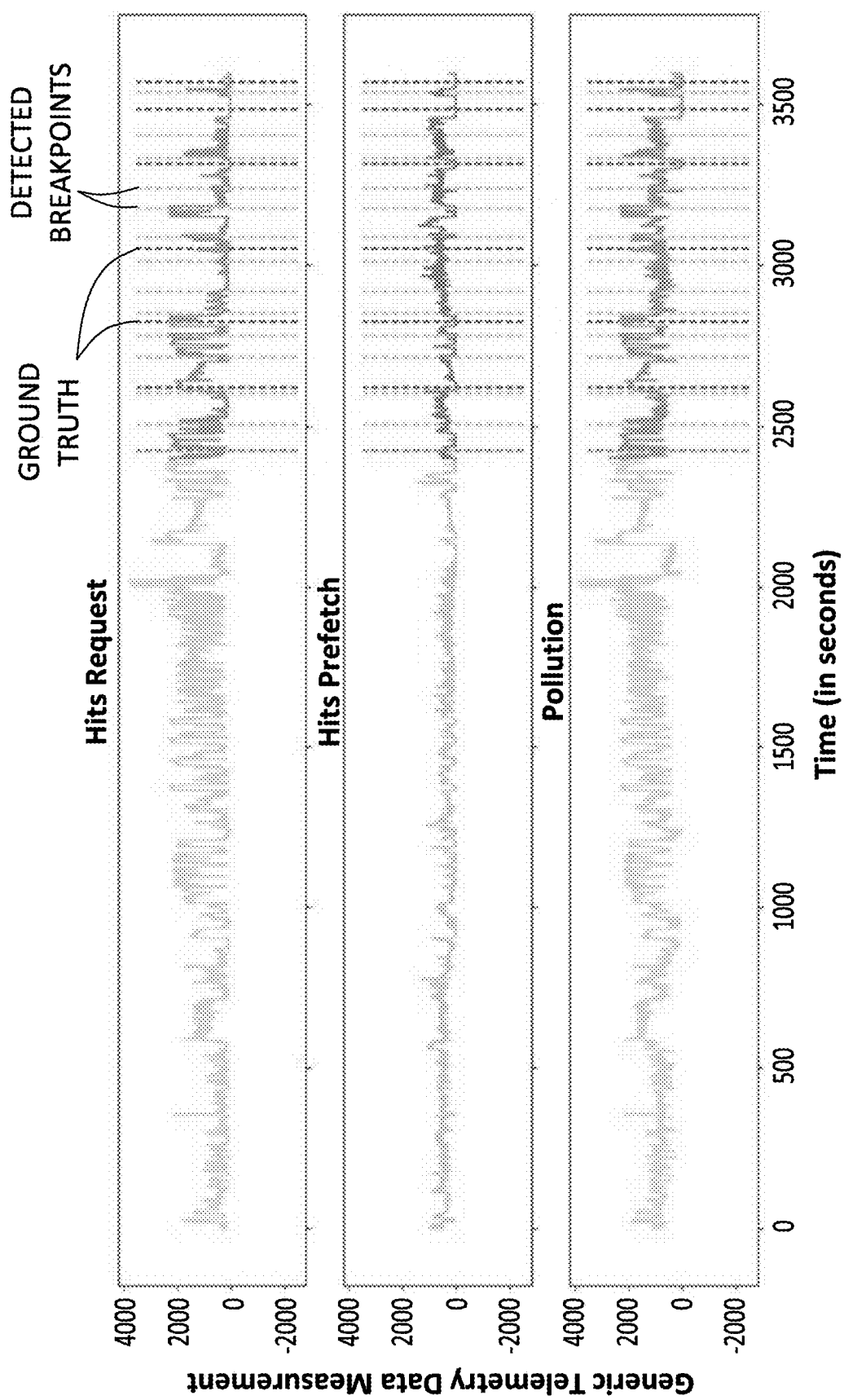
FIG. 29 discloses detected breakpoints (orange) and ground truth (black) over the last 20 minutes of data.

Next, the breakpoint utility evaluation 312 is performed, as described earlier herein. The last detected breakpoints, stored in the breakpoint database 208, are shown in FIG. 29. Particularly, in that Figure, the detected breakpoints (light color vertical broke lines) and the 'ground truth' (dark color vertical broken lines) are shown over the last 20 minutes of data.

It is apparent that the current configuration of the autoencoder breakpoint detection overestimates the number of breakpoints. Compare FIG. 28 with FIG. 22. This overestimation negatively impacts the evaluation. Ultimately, the score obtained for these breakpoints is 0.5925 (with A=0.5933, B=0.161 over only 1200 samples). That comprises a substantial drop from 0.6786 obtained in the first 40 minutes of data, illustrating that the autoencoder model has drifted. This triggers a reparameterization in this example.

Figure 30:
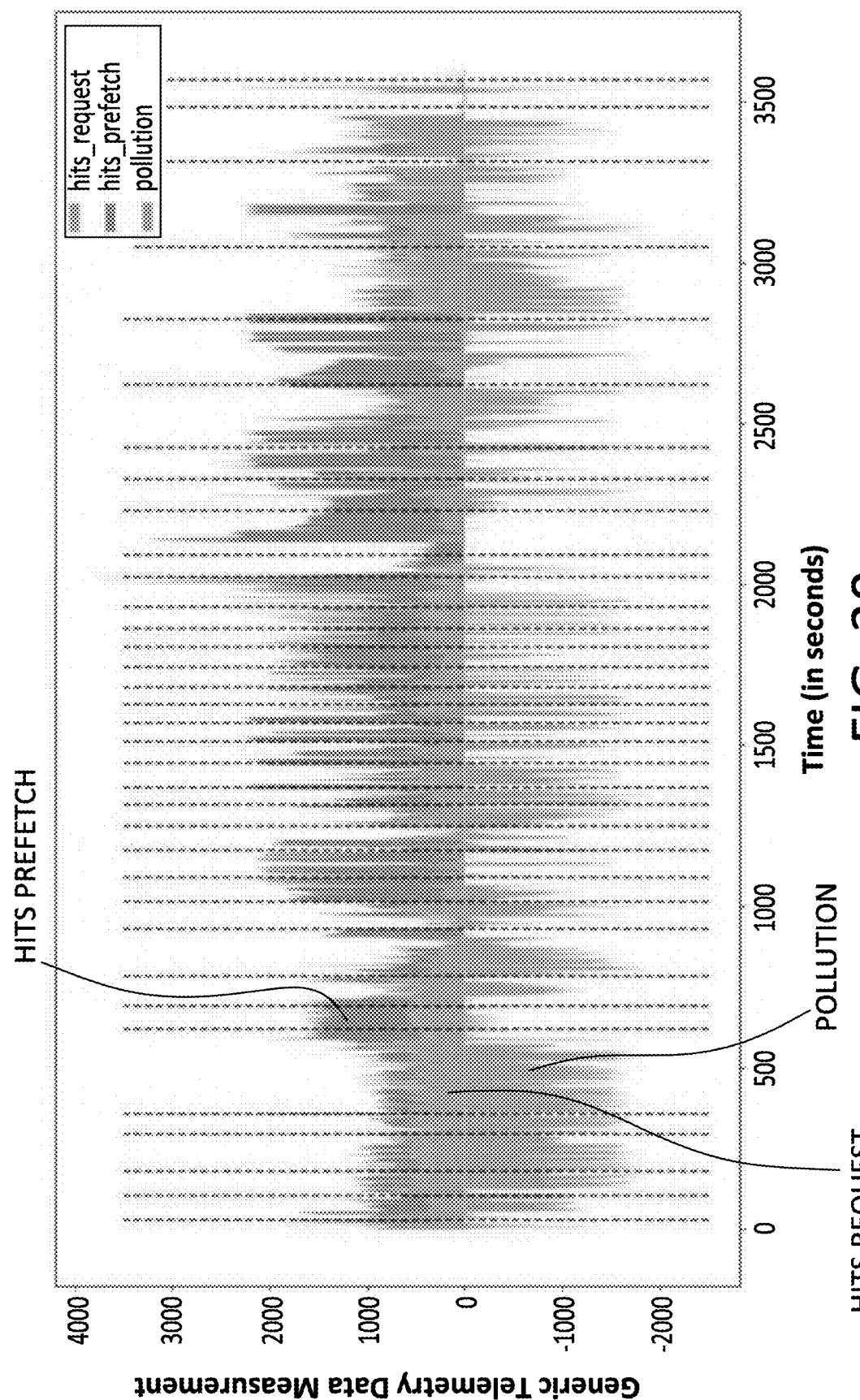
FIG. 30 discloses stacked hit and pollution series corresponding to an hour of workload (segmentation in sequential periods is indicated by the vertical dotted lines).

With reference now to FIGS. 11 and 30, further details are provided concerning a parameterization process 302. This particular example refers to the re-parametrization triggered after the drop in utility of the detected breakpoints. The focus here is on the change of window size argument, and recalls the earlier discussion on the parametrization for the hit and pollution series domain. It can be seen in FIG. 30 that the average length of the sequential periods has increased substantially after the first 40 minutes. Particularly, FIG. 30 discloses stacked hit and pollution series corresponding to a full hour of workload. The segmentation in sequential periods are signaled by the vertical dotted lines. Thus, in present illustrative example, the autoencoder network is retrained 304 with an increased window size of 19, that is, increased from 8. The window overlapping parameter would similarly be increased to 4.

The proposed approach discussed above with reference to the processes of FIG. 11 envisions the continuity of the processes described here. After this re-parametrization 302, the new autoencoder DNN would be used from then on for the generation of feature distance series and consequent breakpoint detection as new samples are obtained from the computational environment.

F. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar platforms, as well as the Dell-EMC RecoverPoint and the VMWare SRM (Site Recovery Manager) platforms. Further, storage platforms such as, but not limited to, the Dell-EMC PowerMax platform, can be employed in various embodiments of the invention.

A data protection environment may take the form of a public or private cloud storage environment, a customer on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients, and which performs disaster recovery (DR) operations including creating and writing to recovery disks.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments (or simply 'segments') such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

In at least some embodiments, the components and functionality disclosed in FIG. 11 (discussed above) can be implemented in a data protection environment. For example, the processes disclosed in FIG. 11 may be performed by a server and/or other hardware at a datacenter. Likewise, the various storage elements indicated in FIG. 11 may reside at a datacenter.

Moreover, at least some embodiments are implemented in connection with storage arrays, hyper-converged infrastructures, and other data handling appliances, some or all of which store information such as operational logs for example. Such information can comprise multi-channel time series information collected by a logging system and/or other elements.

The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

G. Example Host and Server Configurations

Figure 31:
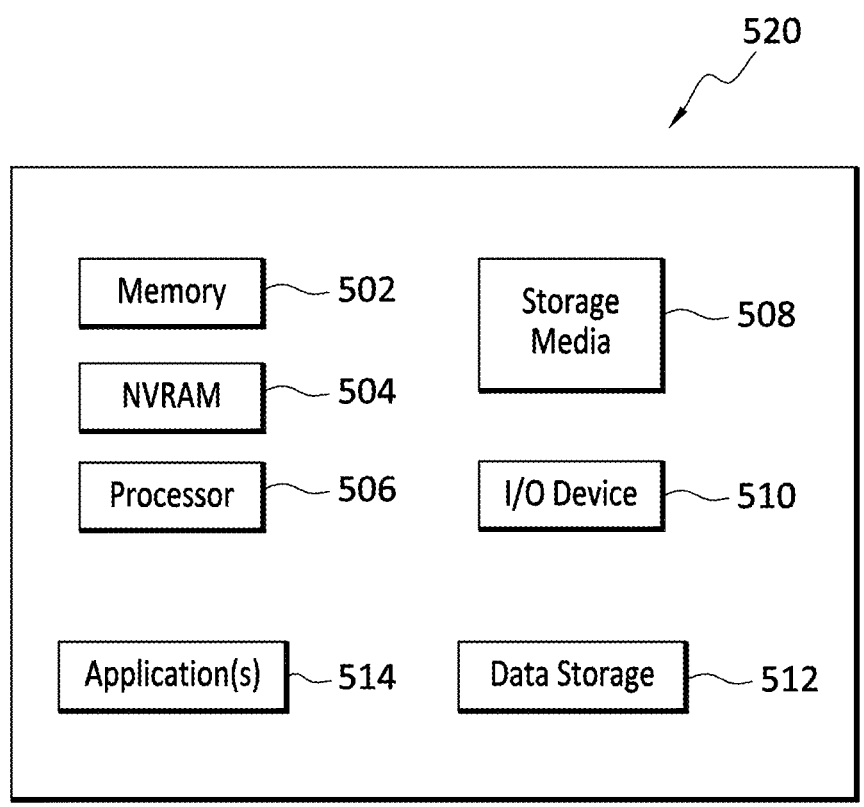
FIG. 31 discloses aspects of an example computing system and device.

With reference briefly now to FIG. 31, any one or more of the I/O traces data 202, autoencoder DNN 204, difference series 206, breakpoints 208, and computational appliance environment 400 can take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 31.

In the example of FIG. 31, the physical computing device 500 includes a memory 502 which can include one, some, or all, of random access memory (RAM), non-volatile random access memory (NVRAM) 504, read-only memory (ROM), and persistent memory, one or more hardware processors 505, non-transitory storage media 508, I/O device 510, and data storage 512. One or more of the memory components 502 of the physical computing device 500 can take the form of solid state device (SSD) storage. As well, one or more applications 514 are provided that comprise executable instructions. Examples of such applications include any application for performing any one or more of the methods, or portions thereof, disclosed herein, including, but not limited to, the method 600 discussed below in connection with FIG. 32.

Such executable instructions can take various forms including, for example, instructions executable to perform any method or portion thereof disclosed herein, and/or executable by/at any of a storage site, whether on-premise at an enterprise, or a cloud storage site, client, datacenter, backup server, blockchain network, or blockchain network node, to perform functions disclosed herein. As well, such instructions may be executable to perform any of the other operations disclosed herein, including, but not limited, to the processes disclosed in connection with FIG. 11.

H. Example Method

Figure 32:
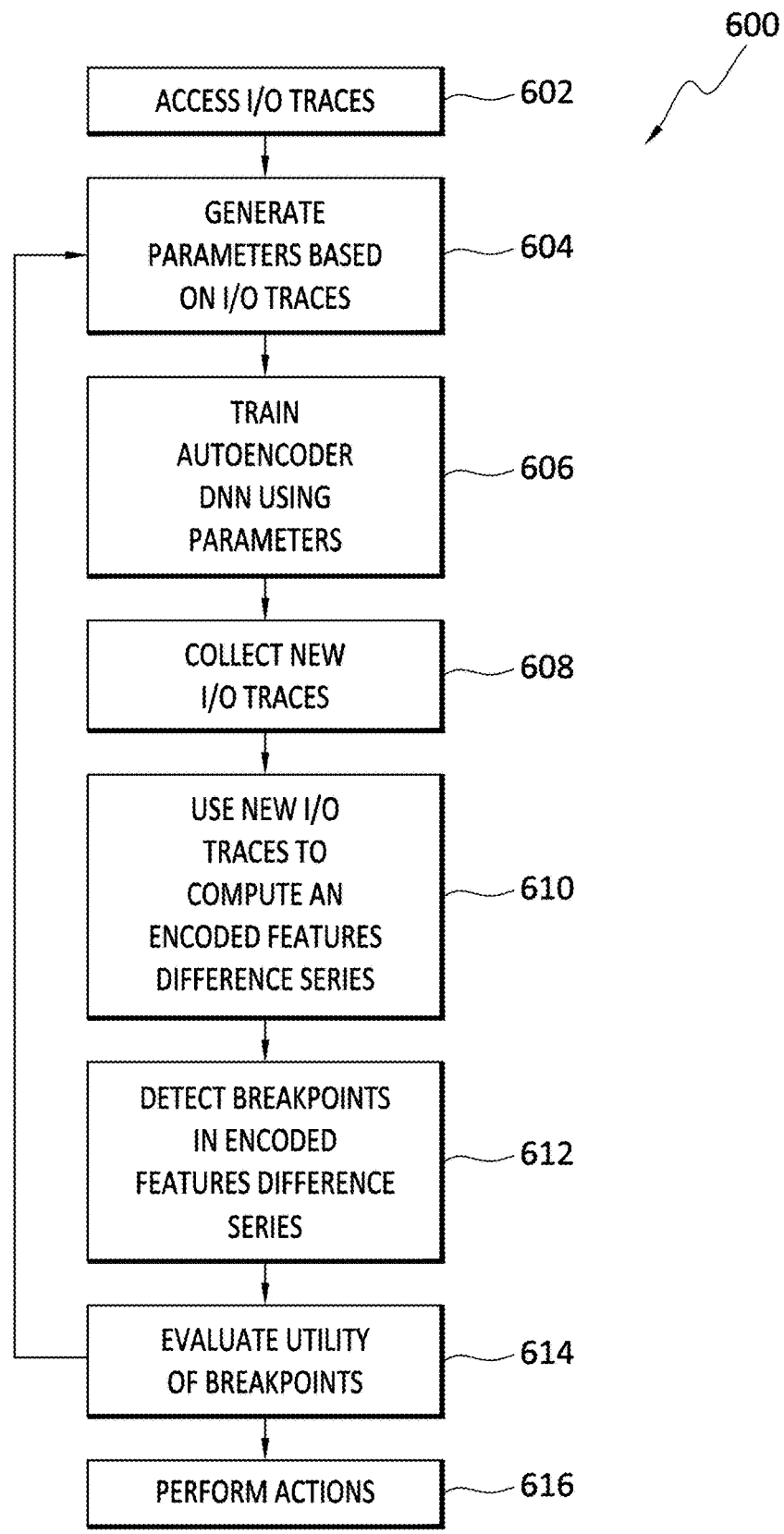
FIG. 32 discloses a method according to one or more embodiments of the invention.

With attention now to FIG. 32, aspects of an example method 600 are disclosed. The method 600 can be performed in, and/or in connection with, a storage system, for example. The method 600 may be useful in various applications including, but not limited to, using I/O trace information to characterize an operational state of an associated system in connection with which the I/O traces were generated.

The example method 600 can begin by accessing I/O traces 602. The I/O traces may or may not be new and, in either case, can be stored for later use. Next, parameters are generated 604 based on the I/O traces. As part of the process 604, or separately, an autoencoder deep neural network is defined. The various parameters are then used to train 606 the autoencoder deep neural network. As disclosed herein, the autoencoder deep neural network may be periodically retrained based on new I/O traces that have been collected 608 and corresponding parameters generated base on the new I/O traces.

As well, the new I/O traces are used to compute an encoded features difference series 610. Then, breakpoints are detected 612 in the encoded features difference series. The utility of the breakpoints is then evaluated 614 and, based on the outcome of the evaluation, various actions can be performed 616.

Details concerning various aspects of the method 600 are disclosed elsewhere herein. As well, it will be appreciated that the method 600 is presented only by way of example, and can be varied according to the disclosure to define various other methods. Thus, the scope of the invention is not limited to the example method 600.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    obtaining a multi-channel time series comprising I/O traces from a computational appliance;
    defining parameters based on the I/O traces, and generating an autoencoder deep neural network;
    training the autoencoder deep neural network using the parameters;
    collecting and storing new I/O traces samples, wherein the I/O traces and/or the new I/O traces comprise multi-channel time series data;
    obtaining encoded features resulting from the autoencoder deep neural network using samples of the new I/O traces as input;
    computing an encoded features difference series using the encoded features of the new I/O traces samples;
    detecting breakpoints in the encoded features difference series;
    evaluating a utility of the breakpoints, and the evaluating of the utility of the breakpoints results in a weighted composition of a true-positive factor and a false positive factor, where:
        the true-positive factor=a sum of distances from each ground truth point to a closest discovered breakpoint, divided by a length of the multi-channel time series; and
        the false-positive factor=a sum of distances from each discovered breakpoint to a closest ground truth point, divided by the length of the multi-channel time series; and
    performing an operational action involving the computational appliance based on the weighted composition obtained from the evaluating of the utility of the breakpoints.

2. The method as recited in claim 1, wherein the computational appliance comprises a storage array or hyperconverged infrastructure appliance, and wherein obtaining the I/O traces comprises collecting and storing data from one or more logging systems and/or monitoring systems.

3. The method as recited in claim 1, wherein when an unexpected breakpoint is detected that leads to an undesired operational state of an underlying system, the operational action comprises repairing the system.

4. The method as recited in claim 1, wherein detecting breakpoints in the encoded features difference series comprises one-dimensional local maxima detection.

5. The method as recited in claim 1, further comprising using the multi-channel time series data to characterize an operational state of an underlying system.

6. The method as recited in claim 2, further comprising using the identified breakpoints as a basis for implementing cache policy optimization.

7. The method as recited in claim 1, wherein the I/O traces and new I/O traces are in the same domain as a set of target data.

8. The method as recited in claim 1, wherein defining parameters is performed again after being triggered by evaluation of the utility of the breakpoints.

9. The method as recited in claim 8, further comprising retraining the autoencoder deep neural network.

10. The method as recited in claim 2, wherein the operational actions performed based on the breakpoint utility evaluation comprise any one or more of: automatic tuning of a storage appliance to optimally satisfy application requirements; generating a data prefetching configuration; performing an adaptation of a cache policy; and performing automated anomaly detection.

11. A non-transitory storage medium having stored therein computer-executable instructions which are executable by one or more hardware processors, to perform operations comprising:
    obtaining a multi-channel time series comprising I/O traces from a computational appliance;
    defining parameters based on the I/O traces, and generating an autoencoder deep neural network;
    training the autoencoder deep neural network using the parameters;
    collecting and storing new I/O traces samples, wherein the I/O traces and/or the new I/O traces comprise multi-channel time series data;
    obtaining encoded features resulting from the autoencoder deep neural network using samples of the new I/O traces as input;

computing an encoded features difference series using the encoded features of the new I/O traces samples;

detecting breakpoints in the encoded features difference series;

evaluating a utility of the breakpoints, and the evaluating of the utility of the breakpoints results in a weighted composition of a true-positive factor and a false positive factor, where:

the true-positive factor=a sum of distances from each ground truth point to a closest discovered breakpoint, divided by a length of the multi-channel time series; and the false-positive factor=a sum of distances from each discovered breakpoint to a closest ground truth point, divided by the length of the multi-channel time series; and performing an operational action involving the computational appliance based on the weighted composition obtained from the evaluating of the utility of the breakpoints.

12. The non-transitory storage medium as recited in claim 11, wherein the computational appliance comprises a storage array or hyperconverged infrastructure appliance, and wherein obtaining the I/O traces comprises collecting and storing data from one or more logging systems and/or monitoring systems.

13. The non-transitory storage medium as recited in claim 11, wherein when an unexpected breakpoint is detected that leads to an undesired operational state of an underlying system, the operational action comprises repairing the system.

14. The non-transitory storage medium as recited in claim 11, wherein detecting breakpoints in the encoded features difference series comprises one-dimensional local maxima detection.

15. The non-transitory storage medium as recited in claim 11, wherein the operations further comprise using the multi-channel time series data to characterize an operational state of an underlying system.

16. The non-transitory storage medium as recited in claim 11, further comprising using the identified breakpoints as a basis for implementing cache policy optimization.

17. The non-transitory storage medium as recited in claim 11, wherein the I/O traces and new I/O traces are in the same domain as a set of target data.

18. The non-transitory storage medium as recited in claim 11, wherein defining parameters is performed again after being triggered by evaluation of the utility of the breakpoints.

19. The non-transitory storage medium as recited in claim 18, wherein the operations further comprise retraining the autoencoder deep neural network.

20. The non-transitory storage medium as recited in claim 11, wherein the operational actions performed based on the breakpoint utility evaluation comprise any one or more of: automatic tuning of a storage appliance to optimally satisfy application requirements; generating a data prefetching configuration; performing an adaptation of a cache policy; and performing automated anomaly detection.

* * * * *